(12) United States Patent
Torrens et al.

(10) Patent No.: US 7,962,505 B2
(45) Date of Patent: Jun. 14, 2011

(54) USER TO USER RECOMMENDER

(75) Inventors: Marc Torrens, Corvallis, OR (US); Pere Ferrera, Barcelona (ES)

(73) Assignee: Strands, Inc., Corvallis, OR (US)

( * ) Notice: Subject to any disclaimer, the term of this patent is extended or adjusted under 35 U.S.C. 154(b) by 0 days.

(21) Appl. No.: 11/641,619

(22) Filed: Dec. 19, 2006

(65) Prior Publication Data

US 2007/0203790 A1    Aug. 30, 2007

Related U.S. Application Data

(60) Provisional application No. 60/752,102, filed on Dec. 19, 2005.

(51) Int. Cl.
*G06F 7/00*    (2006.01)
*G06F 17/00*    (2006.01)

(52) U.S. Cl. ...................................... 707/767

(58) Field of Classification Search .................... 705/10; 707/104.1, 767
See application file for complete search history.

(56) References Cited

U.S. PATENT DOCUMENTS

| | | | |
|---|---|---|---|
| 5,349,339 A | 9/1994 | Kind | |
| 5,355,302 A | 10/1994 | Martin | |
| 5,375,235 A | 12/1994 | Berry | |
| 5,464,946 A | 11/1995 | Lewis | |
| 5,483,278 A | 1/1996 | Strubbe | |
| 5,583,763 A | 12/1996 | Atcheson et al. | |
| 5,754,939 A | 5/1998 | Herz | |
| 5,758,257 A | 5/1998 | Herz | |
| 5,890,152 A | 3/1999 | Rapaport | |
| 5,918,014 A | 6/1999 | Robinson | |
| 5,950,176 A | 9/1999 | Keiser | |
| 6,000,044 A | 12/1999 | Chrysos | |
| 6,047,311 A | 4/2000 | Ueno | |
| 6,112,186 A * | 8/2000 | Bergh et al. | ...................... 705/10 |
| 6,134,532 A | 10/2000 | Lazarus | |
| 6,345,288 B1 | 2/2002 | Reed | |
| 6,346,951 B1 | 2/2002 | Mastronardi | |
| 6,347,313 B1 | 2/2002 | Ma | |
| 6,381,575 B1 | 4/2002 | Martin | |
| 6,430,539 B1 | 8/2002 | Lazarus | |

(Continued)

FOREIGN PATENT DOCUMENTS

EP    1 050 833    8/2000

(Continued)

OTHER PUBLICATIONS

International Bureau; PCT Search Report and Written Opinion; Mar. 20, 2008; 10 Pages.

(Continued)

*Primary Examiner* — Greta L Robinson
*Assistant Examiner* — Jeffrey Chang
(74) *Attorney, Agent, or Firm* — Stolowitz Ford Cowger LLP

(57) ABSTRACT

Disclosed are embodiments of systems and methods for recommending relevant users to other users in a user community. In one implementation of such a method, two different sets of data are considered: a) music (or other items) that users have been listening to (or otherwise engaging), and b) music (or other items) recommendations that users have been given. In some embodiments, pre-computation methods allow the system to efficiently compare item sets and recommended item sets among the users in the community. Such comparisons may also comprise metrics that the system can use to figure out which users should be recommended for a given target user.

15 Claims, 14 Drawing Sheets

U.S. PATENT DOCUMENTS

| | | |
|---|---|---|
| 6,434,621 B1 | 8/2002 | Pezzillo |
| 6,438,579 B1 * | 8/2002 | Hosken .................. 709/203 |
| 6,487,539 B1 | 11/2002 | Aggarwal |
| 6,526,411 B1 | 2/2003 | Ward |
| 6,532,469 B1 | 3/2003 | Feldman |
| 6,577,716 B1 | 6/2003 | Minter |
| 6,587,127 B1 | 7/2003 | Leeke |
| 6,615,208 B1 | 9/2003 | Behrens |
| 6,647,371 B2 | 11/2003 | Shinohara |
| 6,687,696 B2 | 2/2004 | Hofmann et al. |
| 6,690,918 B2 * | 2/2004 | Evans et al. ............. 455/41.2 |
| 6,704,576 B1 | 3/2004 | Brachman |
| 6,748,395 B1 * | 6/2004 | Picker et al. ..................... 1/1 |
| 6,751,574 B2 | 6/2004 | Shinohara |
| 6,785,688 B2 | 8/2004 | Abajian |
| 6,842,761 B2 | 1/2005 | Diamond |
| 6,850,252 B1 | 2/2005 | Hoffberg |
| 6,914,891 B2 | 7/2005 | Ha |
| 6,931,454 B2 | 8/2005 | Deshpande |
| 6,941,324 B2 | 9/2005 | Plastina |
| 6,947,922 B1 | 9/2005 | Glance |
| 6,950,804 B2 | 9/2005 | Strietzel |
| 6,987,221 B2 | 1/2006 | Platt |
| 6,990,497 B2 | 1/2006 | O'Rourke |
| 6,993,532 B1 | 1/2006 | Platt |
| 7,020,637 B2 | 3/2006 | Bratton |
| 7,021,836 B2 | 4/2006 | Anderson |
| 7,051,352 B1 | 5/2006 | Schaffer |
| 7,072,846 B1 * | 7/2006 | Robinson ..................... 705/10 |
| 7,082,407 B1 | 7/2006 | Bezos |
| 7,096,234 B2 | 8/2006 | Plastina |
| 7,111,240 B2 | 9/2006 | Crow |
| 7,113,917 B2 | 9/2006 | Jacobi |
| 7,113,999 B2 | 9/2006 | Pestoni |
| 7,120,619 B2 | 10/2006 | Drucker |
| 7,127,143 B2 | 10/2006 | Elkins |
| 7,136,866 B2 | 11/2006 | Springer, Jr. |
| 7,139,723 B2 | 11/2006 | Conkwright |
| 7,174,126 B2 | 2/2007 | McElhatten |
| 7,180,473 B2 | 2/2007 | Horie |
| 7,194,421 B2 | 3/2007 | Conkwright |
| 7,197,472 B2 | 3/2007 | Conkwright |
| 7,224,282 B2 | 5/2007 | Terauchi |
| 7,236,941 B2 | 6/2007 | Conkwright |
| 7,256,341 B2 | 8/2007 | Plastina |
| 7,302,419 B2 | 11/2007 | Conkwright |
| 7,302,468 B2 | 11/2007 | Wijeratne |
| 7,358,434 B2 | 4/2008 | Plastina |
| 7,363,314 B2 | 4/2008 | Picker |
| 7,392,212 B2 | 6/2008 | Hancock |
| 7,403,769 B2 | 7/2008 | Kopra |
| 7,415,181 B2 | 8/2008 | Greenwood |
| 7,434,247 B2 | 10/2008 | Dudkiewicz |
| 7,457,862 B2 | 11/2008 | Hepworth |
| 7,478,323 B2 | 1/2009 | Dowdy |
| 7,493,572 B2 | 2/2009 | Card |
| 7,499,630 B2 | 3/2009 | Koch |
| 7,505,959 B2 | 3/2009 | Kaiser |
| 7,524,521 B2 | 4/2009 | Takahashi |
| 7,546,254 B2 | 6/2009 | Bednarek |
| 7,568,213 B2 | 7/2009 | Carhart |
| 7,574,422 B2 | 8/2009 | Guan |
| 7,574,513 B2 | 8/2009 | Dunning |
| 7,580,932 B2 | 8/2009 | Plastina |
| 7,599,950 B2 | 10/2009 | Walther |
| 7,644,077 B2 | 1/2010 | Picker |
| 7,657,224 B2 | 2/2010 | Goldberg |
| 7,734,569 B2 | 6/2010 | Martin |
| 2001/0056434 A1 | 12/2001 | Kaplan |
| 2002/0002899 A1 | 1/2002 | Gjerdingen |
| 2002/0042912 A1 | 4/2002 | Iijima |
| 2002/0059094 A1 | 5/2002 | Hosea |
| 2002/0082901 A1 | 6/2002 | Dunning |
| 2002/0152117 A1 | 10/2002 | Cristofalo |
| 2002/0178223 A1 | 11/2002 | Bushkin |
| 2002/0178276 A1 | 11/2002 | McCartney |
| 2002/0194215 A1 | 12/2002 | Cantrell |
| 2003/0022953 A1 | 1/2003 | Zampini |
| 2003/0033321 A1 | 2/2003 | Schrempp |
| 2003/0055689 A1 | 3/2003 | Block |
| 2003/0097379 A1 | 5/2003 | Ireton |
| 2003/0120630 A1 | 6/2003 | Tunkelang |
| 2003/0212710 A1 | 11/2003 | Guy |
| 2003/0229537 A1 | 12/2003 | Dunning |
| 2004/0002993 A1 | 1/2004 | Toussaint |
| 2004/0003392 A1 | 1/2004 | Trajkovic |
| 2004/0068552 A1 | 4/2004 | Kotz |
| 2004/0073924 A1 | 4/2004 | Pendakur |
| 2004/0128286 A1 | 7/2004 | Yasushi |
| 2004/0139064 A1 | 7/2004 | Chevallier |
| 2004/0148424 A1 | 7/2004 | Berkson |
| 2004/0158860 A1 | 8/2004 | Crow |
| 2004/0162738 A1 | 8/2004 | Sanders |
| 2004/0194128 A1 | 9/2004 | McIntyre |
| 2004/0247715 A1 | 12/2004 | Kuo |
| 2005/0019114 A1 | 1/2005 | Sung |
| 2005/0021470 A1 | 1/2005 | Martin |
| 2005/0060350 A1 | 3/2005 | Baum |
| 2005/0075908 A1 | 4/2005 | Stevens |
| 2005/0102610 A1 | 5/2005 | Jie |
| 2005/0114357 A1 | 5/2005 | Chengalvarayan |
| 2005/0141709 A1 | 6/2005 | Bratton |
| 2005/0154608 A1 | 7/2005 | Paulson |
| 2005/0160458 A1 | 7/2005 | Baumgartner |
| 2005/0193014 A1 | 9/2005 | Prince |
| 2005/0193054 A1 | 9/2005 | Wilson et al. |
| 2005/0195696 A1 | 9/2005 | Rekimoto |
| 2005/0203807 A1 | 9/2005 | Bezos et al. |
| 2005/0210101 A1 | 9/2005 | Janik |
| 2005/0216855 A1 | 9/2005 | Kopra |
| 2005/0222989 A1 | 10/2005 | Haveliwala |
| 2005/0223039 A1 | 10/2005 | Kim |
| 2005/0234891 A1 | 10/2005 | Walther |
| 2005/0235811 A1 | 10/2005 | Dukane |
| 2005/0256867 A1 | 11/2005 | Walther |
| 2005/0276570 A1 | 12/2005 | Reed et al. |
| 2006/0015904 A1 | 1/2006 | Marcus |
| 2006/0018208 A1 | 1/2006 | Nathan |
| 2006/0018209 A1 | 1/2006 | Drakoulis |
| 2006/0020062 A1 | 1/2006 | Bloom |
| 2006/0026263 A1 | 2/2006 | Raghavan |
| 2006/0053077 A1 | 3/2006 | Mourad |
| 2006/0062094 A1 | 3/2006 | Nathan |
| 2006/0067296 A1 | 3/2006 | Bershad |
| 2006/0074750 A1 | 4/2006 | Clark |
| 2006/0080356 A1 | 4/2006 | Burges |
| 2006/0091203 A1 | 5/2006 | Bakker |
| 2006/0100978 A1 | 5/2006 | Heller |
| 2006/0112098 A1 | 5/2006 | Renshaw |
| 2006/0123052 A1 | 6/2006 | Robbins |
| 2006/0136344 A1 | 6/2006 | Jones |
| 2006/0143236 A1 | 6/2006 | Wu |
| 2006/0165571 A1 | 7/2006 | Seon |
| 2006/0168616 A1 | 7/2006 | Candelore |
| 2006/0173910 A1 | 8/2006 | McLaughlin |
| 2006/0173916 A1 | 8/2006 | Verbeck |
| 2006/0195462 A1 | 8/2006 | Rogers |
| 2006/0195513 A1 | 8/2006 | Rogers |
| 2006/0195514 A1 | 8/2006 | Rogers |
| 2006/0195515 A1 | 8/2006 | Beaupre |
| 2006/0195516 A1 | 8/2006 | Beaupre |
| 2006/0195521 A1 | 8/2006 | New |
| 2006/0195789 A1 | 8/2006 | Rogers |
| 2006/0195790 A1 | 8/2006 | Beaupre |
| 2006/0253874 A1 | 11/2006 | Stark |
| 2006/0277098 A1 | 12/2006 | Chung |
| 2006/0282311 A1 | 12/2006 | Jiang |
| 2006/0288044 A1 | 12/2006 | Kashiwagi |
| 2006/0288367 A1 | 12/2006 | Swix |
| 2007/0016507 A1 | 1/2007 | Tzara |
| 2007/0043829 A1 | 2/2007 | Dua |
| 2007/0100690 A1 | 5/2007 | Hopkins |
| 2007/0118546 A1 | 5/2007 | Acharya |
| 2007/0136264 A1 | 6/2007 | Tran |
| 2007/0156677 A1 | 7/2007 | Szabo |
| 2007/0161402 A1 | 7/2007 | Ng |
| 2007/0244880 A1 | 10/2007 | Martin |

| | | | |
|---|---|---|---|
| 2007/0250429 | A1 | 10/2007 | Walser |
| 2007/0250761 | A1 | 10/2007 | Bradley |
| 2007/0422880 | | 10/2007 | Martin |
| 2007/0271286 | A1 | 11/2007 | Purang |
| 2007/0294096 | A1 | 12/2007 | Randall |
| 2008/0004948 | A1 | 1/2008 | Flake |
| 2008/0004990 | A1 | 1/2008 | Flake |
| 2008/0027881 | A1 | 1/2008 | Bisse |
| 2008/0046317 | A1 | 2/2008 | Christianson |
| 2008/0077264 | A1 | 3/2008 | Irvin |
| 2008/0082467 | A1 | 4/2008 | Meijer |
| 2008/0133601 | A1 | 6/2008 | Cervera |
| 2008/0155057 | A1 | 6/2008 | Khedouri |
| 2008/0155588 | A1 | 6/2008 | Roberts |
| 2008/0220855 | A1 | 9/2008 | Chen |
| 2008/0270221 | A1 | 10/2008 | Clemens |
| 2009/0024504 | A1 | 1/2009 | Lerman |
| 2009/0024510 | A1 | 1/2009 | Chen |
| 2009/0073174 | A1 | 3/2009 | Berg |
| 2009/0076939 | A1 | 3/2009 | Berg |
| 2009/0076974 | A1 | 3/2009 | Berg |
| 2009/0083307 | A1 | 3/2009 | Cervera |
| 2009/0089222 | A1 | 4/2009 | Ferreira |
| 2009/0106085 | A1 | 4/2009 | Raimbeault |
| 2009/0210415 | A1 | 8/2009 | Martin |
| 2009/0276368 | A1 | 11/2009 | Martin |

FOREIGN PATENT DOCUMENTS

| | | |
|---|---|---|
| EP | 1 231 788 A1 | 8/2002 |
| EP | 1420388 | 5/2004 |
| EP | 1 548 741 A1 | 6/2005 |
| JP | 11-052965 | 2/1999 |
| JP | 2002-108351 | 4/2002 |
| JP | 2002-320203 A | 10/2002 |
| JP | 2003-255958 | 9/2003 |
| JP | 2004221999 A | 8/2004 |
| JP | 2005027337 A | 1/2005 |
| KR | 2002025579 | 4/2002 |
| WO | WO 2003036541 A1 | 5/2003 |
| WO | 03/051051 A1 | 6/2003 |
| WO | WO2004070538 | 8/2004 |
| WO | 20051013114 A1 | 2/2005 |
| WO | WO 2005115107 A2 | 12/2005 |
| WO | WO2006052837 | 5/2006 |
| WO | 20061075032 | 7/2006 |
| WO | 20061114451 | 11/2006 |
| WO | WO 2007/038806 A3 | 4/2007 |
| WO | WO2007134193 | 5/2007 |
| WO | WO2007092053 | 8/2007 |
| WO | 200910149046 A1 | 12/2009 |

OTHER PUBLICATIONS

Alvear, Jose, "Risk-Free Trial Streaming Media Delivery Tools," Streaming Media.com; www.streamingmedia.com/article.ap?id=5768, Jun. 30, 2000.
Deshpande, Mukund, et al., "Item-Based Top-N Recommendation Algoriths," ACM Transactions on Information Systems, 22:1 (Jan. 2004), pp. 143-177.
Pachet, Francois, A Taxonomy of Musical Genres, Content-Based Multimedia Information Access Conference (RIAO), Paris, Apr. 2000, 8 pages. Not Submitted in IDS.
Platt, John C. et al., "Learning a Gaussian Process Prior for Automatically Generating Music Playlists," Microsoft Corporation {platt, cburgess, sswenson, chriswea}@microsoft.com, alcez@cs.berkeley.edu, pp. 1-9.
Platt, John S., "Fasting Embedding of Sparse Music Similarity Graphs," Microsoft Corporation, {jplatt@microsoft.com}.
Smart Computing, "The Scoop on File-Sharing Services," Dec. 2000, vol. 11, Issue 12; pp. 30-33 in printed issue. Available at www.smartcomputing.com/editorial/article.asp?article=articles%2F2000%Fs1112°/02F08s12.asp.
www.akoo.com/Akoo/, Web Page, AKOO, Pick the Music, Waiting in the line at the Theme Park, Introducing the m-Venue™ platform.
www.axcessnews.com/modules/wfsection/article.php?articleid=8327, Web Page, Feb. 24, 2006, Maintenance Fees, Digital Music Sales Triple to $1.1 Billion in 2005.
www.bmi.com/news/200403/20040324b.asp, Web Page, BMI ™ Figures Don'T Lie, Mar. 24, 2004, Touch Tunes Signs License Agreement for BMI Music in Digital Jukeboxes.
www.ecastinc.com/music_licensing.html, Web Page, ECAST Network, interactive entertainment network, Music/Licensing.
www.rfidjournal.com/article/articleview/1619/1/1, Web Page, RFID brings messages to Seattle side walks on RFID system being deployed next week will send marketing and assistive information to users carrying active RFID tags. RFID Journal (pp. 1-4).
www.roweinternational.com/jukeboxes_dia.html, Web Page, Digital Internet Access Jukeboxes, Rowe International.
www.touchtunes.com, Web Page, Touchtunes, Turn your ROWE 100A's and 100B's into touch tunes Digital Jukeboxes—BOSE.
www.alwayson-network.com/comments.php?id=P12663 0 37 0 C, Web Page, Not Your Average Jukebox, On Hollywood 1000 contender Ecast users broadbank to being the digital media experience to your watering hole.
Cano, Pedro et al., On the Use of FastMap for Audio Retrieval and Browsing, The International Conference on Music Information Retrieval and Related Activities (ISMIR 2002), Paris, France, Oct. 2002, 2 pages.
Connell, lain et al., Ontological Sketch Models: Highlighting User-System Misfits, in P. Palanque, E. O'Neill and P. Johnson, editors, Proceedings of Human Computer Interaction (HCI) Bath, England, Sep. 2003, London Springer, pp. 1-16.
The Trustees of Indiana University, Variations2, The Indiana University Digital Music Library, http://dml.indiana.edu/, last updated May 11, 2005, 1 page.
Logan, Beth, Content-Based Playlist Generation: Exploratory Experiments, The International Conference on Music Information Retrieval and Related Activities (ISMIR 2002), Paris, France, Oct. 2002, 2 pages.
Logan, Beth et al., A Music Similarity Function Based on Signal Analysis, IEEE International Conference on Multimedia and Expo (ICME), Tokyo, Japan, Aug. 2001, IEEE Press, pp. 952-955.
Maidin, Donncha O et al., The Best of Two Worlds: Retrieving and Browsing, Proceedings of the COST G-6 Conference on Digital Audio Effects (DAFX-00), Verona, Italy, Dec. 7-9, 2000, 4 pages.
Notess, Mark et al., Variations2: Toward Visual Interface for Digital Music Libraries, Second International Workshop on Visual Interfaces to Digital Libraries, 2002, 6 pages.
Pampalk, Elias et al., Content-based Organization and Visualization of Music Archives, ACM Multimedia, Juan les Pins, France, Dec. 2002, pp. 570-579.
Pauws, Steffen et al., PATS: Realization and User Evaluation of an Automatic Playlist Generator, The International Conferences on Music Information Retrieval and Related Activities (ISMIR 2002), Paris, France, Oct. 2002, 9 pages.
Rauber, Andreas et al., The SOM-enhanced JukeBox: Organization and Visualization of Music Collections Based on Perceptual Models, Journal of New Music Research, vol. 32, Nov. 2, 2003, pp. 193-210.
Shneiderman, Ben, Tree Visualization with Tree-Maps: 2-d Space-Filling Approach, ACM Transactions on Graphics, vol. 11, No. 1, Jan. 1992, pp. 92-99.
Treemap, University of Maryland, http://www.cs.umd.edu/hcil/treemap/, last udpated Aug. 5, 2003, 4 pages.
Shneiderman, Ben, Treemaps for Space-Contrained Visualization of Hierarchies, http://www.sc.umd.edutheil/treemaphistory!, last updated Apr. 28, 2006, 16 pages.
Tzanetakis, George et al., MARSYAS3D: A Prototype Audio Browser-Editor Using a Large Scale Immersive Visual and Audio Display, Proceedings of the 2001 International Conference on Auditory Display, Espoo, Finland, Jul./Aug. 2001, 5 pages.
"New Music Recommendation System is Based on FOAF Personal Profiling," www.masternewmedia.org/music_recommendation/music_recommendation_system_FOAF, Oct. 1, 2005.
"Social Networking Meets Music Listening: Mecora Launches Radio 2.0," www.masternewmedia.org/news/2006/04/13/social_networking_meets_music_listening.htm, Apr. 13, 2006.
N. A. Lazar; Bayesian Empirical Likelihood; Technical Report, Carnegi Mellon University, Department of Statistics, 2000; 26 pages.
S. Baluja, R. Seth, D. Sivakumar, Y. Jing, J. Yagnik, S. Kumar, D. Ravichandran, and M. Aly, "Video Suggestion and Discovery for YouTube: Taking Random Walks Through the View Graph". In WWW '08: Proceedings of the 17th international conference on World Wide Web, pp. 895-904, Beijing, China, 2008. ACM Press.

A. Das, M. Datar, A. Garg, and S. Rajaram. "Google News Personalization: Scalable Online Collaborative Filtering". In WWW '07: Proceedings of the 16th international conference on World Wide Web, pp. 271-280, New York, NY, USA, 2007. ACM Press.

J. Dean and S. Ghemawat, "MapReduce: Simplied Data Processing on Large Clusters". Commun. ACM, 51 (1):107-113, 2008.

Y. Dempster, N. Laird, and D. Rubin. "Maximum Likelihood from Incomplete Data via the EM Algorithm". Jour. of the Royal Stat. Soc., Ser. B., 39:1047-1053, 1977.

T. Hofmann. "Unsupervised Learning by Probabilistic Latent Semantic Analysis". Mach. Learn., 42:177-196, 2001.

T. Hofmann. "Latent Semantic Models for Collaborative Filtering". ACM Transactions on Information Systems, 22:89-115, 2004.

P. Indyk and J. Matousek. "Low-Distortion Embeddings of Finite Metric Spaces". In Handbook of Discrete and Computational Geometry, pp. 177-196. CRC Press, 2004.

I. Scihira. "A Characterization of Singular Graphs". Electronic Journal of Linear Algebra, 16:451-462, 2007.

PCT/US2006/034218; International Search Authority; PCT International Search Report; Feb. 9, 2007; 3 pages.

PCT/US06/38769; International Search Report; Mar. 25, 2008.

PCT/US2006/003795; International Search Report and Written Opinion; May 28, 2008.

Augmenting the Social Space of an Academic Conference; McCarthy, et al. Information School, University of Washington and Department of Computer Science and Engineering, University of Minnesota; pp. 1-10; Nov. 6-10, 2004.

Baluja, S., Seth, R., Sivakumar, D., Jing, Y., Yagnik, J., Kumar, S., Ravichandran, D., and Aly, M. "Video Suggestion and Discovery for YouTube: Taking Random Walks Through the View Graph". In WWW '08: Proceedings of the 17th international conference on World Wide Web, pp. 895-904, Beijing, China, 2008. ACM Press.

Carlson et al. "Internet Banking Market Developments and Regulatory Issues in the New Economy: What Changed, and the Challenges for Economic Policy . . . "; May 2001; http://www.occ.gov/netbank/SGEC2000.pdf.

Co-Construction of Hybrid Spaces; Asa Rudstrom; A Dissertation submitted to the University of Stockholm in partial fulfillment of the requirements for the Degree of Doctor of Philosophy; Department of Computer and Systems Sciences Stockholm University and Royal Institute of Technology; pp. 1-69; Nov. 2005.

Das,A., Datar,M., Garg,A., and Rajaram,S. "Google News Personalization: Scalable Online Collaborative Filtering". In WWW '07: Proceedings of the 16th international conference on World Wide Web, pp. 271-280, New York, NY, USA, 2007. ACM Press.

Dean, J. and Ghennawat, S. "MapReduce: Simplied Data Processing on Large Clusters". Commun. ACM, 51(1):107-113, 2008.

Dempster, Y., Laird, N., and Rubin, D. "Maximum Likelihood from Incomplete Data via the EM Algorithm". Jour. of the Royal Stat. Soc., Ser. B., 39:1047-1053, 1977.

Hofmann, T. "Latent Semantic Models for Collaborative Filtering". ACM Transactions on Information Systems, 22:89-115, 2004.

Hofmann, T. "Unsupervised Learning by Probabilistic Latent Semantic Analysis". Mach. Learn., 42:177-196, 2001.

Industry Standard, The, Help FAQs for Standard Prediction Market, http://www.thestandard.com/help, downloaded Jun. 29, 2009.

Indyk, P. and Matousek, J. "Low-Distortion Embeddings of Finite Metric Spaces". In Handbook of Discrete and Computational Geometry, pp. 177-196. CRC Press, 2004.

International Search Report PCT/US2009/051233; Sep. 4, 2009; Strands, Inc.

IP City, Integrated Project on Interaction and Presence on Urban Environments-Demonstrators on Large-Scale Events Applications; ipcity.eu; Giulio Jacucci, John Evans, Tommi Ilmonen; pp. 1-37; Feb. 9, 2007.

Lazar, N.A.; Bayesian Empirical Likelihood; Technical Report, Carnegi Mellon University, Department of Statistics, 2000; 26 pages.

MobiLenin—Combining A Multi-Track Music Video, Personal Mobile Phones and a Public Display into Multi-User Interactive Entertainment; Jurgen Scheible, et al. Media Lab, University of Art and Design, Helsinki, Finland; pp. 1-10; Nov. 6-10, 2005.

PCT/US07/068708; Filed May 10, 2007; International Search Report and Written Opinion; WO 20071134193; Dec. 7, 2007.

PCT/US09/42002; Filed Apr. 28, 2009; International Search Report and Written Opinion; Jun. 2009.

PolyLens: A Recommender System for Groups of Users; M. O'Connor, D. Cosley, J.A. Konstan, J. Riedl; European Conference on Computer Supported Co-Operative Work at Bonn, Germany; Published 2001; pp. 199-218.

Toward alernative metrics of journal impact: a comparison of download and citation data, Johan Bollen, Herbert Van de Sompel, Joan Smith, Rick Luce, Google.com, 2005, pp. 1-2.

Apple: iTunes 4.2 User Guide for Windows; Dec. 2003; retrieved from the internet: URL: http://www2.austin.cc.tx.us/tcm/projects/itunes.pdf; pp. 10, 17-19. (Added Ref Nov. 5, 2009).

Incremental tensor analysis: theory and applications, Jimeng Sun, Dacheng Tao, Spiros Papadimitriou, Philip Yu, Christos Faloutsos, ACM, Oct. 2008, pp. 1-37.

PCT/US2007/09/45725; International Search Report_WO; Jul. 15, 2009.

PCT/US2006/004257 European Search Report Oct. 23, 2009.

IEEE, no matched results, Nov. 11, 2009, 1 page.

PCT/US09/45911; Filed Jun. 2, 2009; International Search Report and Written Opinion.

PCT/US2007/068708; International Search Report; May 10, 2007.

Scihira, I. "A Characterization of Singular Graphs". Electronic Journal of Linear Algebra, 16:451-462, 2007.

Toward University Mobile Interaction for Shared Displays; Tim Paek, et al.; Microsoft Research, Redmond, WA; pp. 1-4; Nov. 6-10, 2004.

Trustees of Indiana University, Variations2, The Indiana University Digital Music Library, http://dmi.indiana.edui, last updated May 11, 2005.

Wolfers, Justin and Zitzewitz, Eric, Prediction Markets, Journal of Economic Perspectives, Spring 2004, pp. 107-126, vol. 18, No. 2.

Yen, Yi-Wyn, Apple announces a 32GB iPhone 3G by Jun. 15, 2009, The Industry Standard, Apr. 2, 2009, http://www.thestandard.com/preditions/channel/hardware, downloaded Apr. 8, 2009.

Bender, et al., "Newspace: Mass Media and Personal Computing," Proceedings of USENIX, Conference, pp. 329-348 (Summer 1991).

Jon Orwant, "Appraising the User of User Models: Doppelganger's Interface," in: A. Kobsa and D. Litman (eds.), Proceeding of the 4th International Conference on User Modeling (1994).

John Thompson, "A Graphic Representation of Interaction With the Nexis News Database," MIT Thesis (May 1983).

Lippman, et al., "News and Movies in the 50 Megabit Living Room," IEEE/IEICE, Global Telecommunications Conference, pp. 1976-1981 (Nov. 15, 1987).

Lie, "The Electronic Broadsheet—All the News That Fits the Display," MIT Master's Thesis, pp. 1-96 (Jun. 1991).

Jonathan L. Orwant, "Doppelganger: A User Modeling System," MIT Bachelor's Thesis (Jun. 1991).

"Lessons from LyricTimeTM: A Prototype Multimedia System" 4th IEEE ComSoc International Workshop on Multimedia Communications (Apr. 1992).

Delivering Interactive Multimedia Documents over Networks; Shoshana Loeb; IEEE Communications Magazine; May 1992; 8 pages.

"Communications of the ACM" Dec. 1992, vol. 35, No. 12 at pp. 26-28 (Introduction to special issue regarding Workshop on High Performance Information Filtering, Morristown, N.J. Nov. 1991).

Belkins, et al., "Information Filtering and Information Retrieval: Two Sides of the Same Coin?", Communications of the ACM (Dec. 1992).

Architecting Personalized Delivery of Multimedia Information,: Communications of the ACM (Dec. 1992).

Jonathan L. Orwant, "Doppelganger Goes to School: Machine Learning for User Modeling," MIT Master of Science Thesis (Sep. 1993).

Bender, "Twenty Years of Personalization: All about the Daily Me," Educause Review (Sep./Oct. 2002).

PCT/ES2005/00003 Written Opinion of the International Searching Authority Report dated Jun. 10, 2005.

PCT/ES2005/00003 International Preliminary Report on Patentability (Ch II) Report dated May 22, 2007.

PCT/ES2005/00003 Written Opinion of the International Preliminary Examining Authority dated Mar. 19, 2007.

PCT/ES2005/000213 Written Opinion of the International Searching Authority dated Jan. 12, 2006.

PCT/ES2005/000213 International Preliminary Report on Patentability (Ch II) Report Dated Nov. 15, 2007.

Strands Business Solutions. "Integration Document v.2.0"; Published May 2008; [online retrieved on Jan. 21, 2010] Retrieved from the internet <URL: http://recommenderstrands.com/doc/SBS-Integration-Document.pdf>; entire document-18 pages.

ShopSmart: Product Recommendations through Technical Specifications and User Reviews; Alexander Yates et al. Temple University; CIKM; Oct. 26-30, 2008, Napa Valley, CA, USA; 2 pages.

PCT/US09/68604 International Search Report and Written Opinion of the International Searching Authority; dated Feb. 17, 2010.

Tom Bunzel, "Easy Digital Music," QUE Publisher, Aug. 18, 2004, Chapters 5 and 8.

Chao-Ming et al. (Chao-Ming), Design and Evaluation and mProducer: a Mobile Authoring Tool for Personal Experience Computing [online], MUM 2004, College Park, Maryland, USA, Oct. 27-29, 2004 [retrieved on Dec. 17, 2010]. [http://citeseerx.ist.psu.edu/viewdocidownload?doi=10.1.1.131.2933&rep=rep1&type=pdf].

* cited by examiner

USER TO USER RECOMMENDER

RELATED APPLICATIONS

This application claims the benefit under 35 U.S.C. §119(e) of U.S. Provisional Patent Application No. 60/752,102 filed Dec. 19, 2005, and titled "User to User Recommender," which is incorporated herein by specific reference.

BRIEF DESCRIPTION OF THE DRAWINGS

Understanding that drawings depict only certain preferred embodiments of the invention and are therefore not to be considered limiting of its scope, the preferred embodiments will be described and explained with additional specificity and detail through the use of the accompanying drawings in which.

DETAILED DESCRIPTION OF PREFERRED EMBODIMENTS

In the following description, certain specific details of programming, software modules, user selections, network transactions, database queries, database structures, etc., are provided for a thorough understanding of the specific preferred embodiments of the invention. However, those skilled in the art will recognize that embodiments can be practiced without one or more of the specific details, or with other methods, components, materials, etc.

In some cases, well-known structures, materials, or operations are not shown or described in detail in order to avoid obscuring aspects of the preferred embodiments. Furthermore, the described features, structures, or characteristics may be combined in any suitable manner in a variety of alternative embodiments. In some embodiments, the methodologies and systems described herein may be carried out using one or more digital processors, such as the types of microprocessors that are commonly found in PC's, laptops, PDA's and all manner of other desktop or portable electronic appliances.

Disclosed are embodiments of systems and methods for recommending users to other users in a user community. As used herein, a "user recommender" is a module integrated in a community of users, the main function of which is to recommend users to other users in that community. There may be a set of items in the community for the users of the community to interact with. [INSERTED PARAGRAPH BREAK]

There may also be an item recommender to recommend other items to the users. Examples of recommender systems that may be used in connection with the embodiments set forth herein are described in U.S. patent application Ser. No. 11/346,818 titled "Recommender System for Identifying a New Set of Media Items Responsive to an Input Set of Media Items and Knowledge Base Metrics," and U.S. patent application Ser. No. 11/048,950 titled "Dynamic Identification of a New Set of Media Items Responsive to an Input Mediaset," both of which are hereby incorporated by reference. A description of the former item recommender system, application Ser. No. 11/346,818 is set forth below with reference to drawing FIGS. 11A, 11B, 12 and 13.

As used herein, the term "media data item" is intended to encompass any media item or representation of a media item. A "media item" is intended to encompass any type of media file which can be represented in a digital media format, such as a song, movie, picture, e-book, newspaper, segment of a TV/radio program, game, etc. Thus, it is intended that the term "media data item" encompass, for example, playable media item files (e.g., an MP3 file), as well as metadata that identifies a playable media file (e.g., metadata that identifies an MP3 file). It should therefore be apparent that in any embodiment providing a process, step, or system using "media items," that process, step, or system may instead use a representation of a media item (such as metadata), and vice versa.

Figure 1:
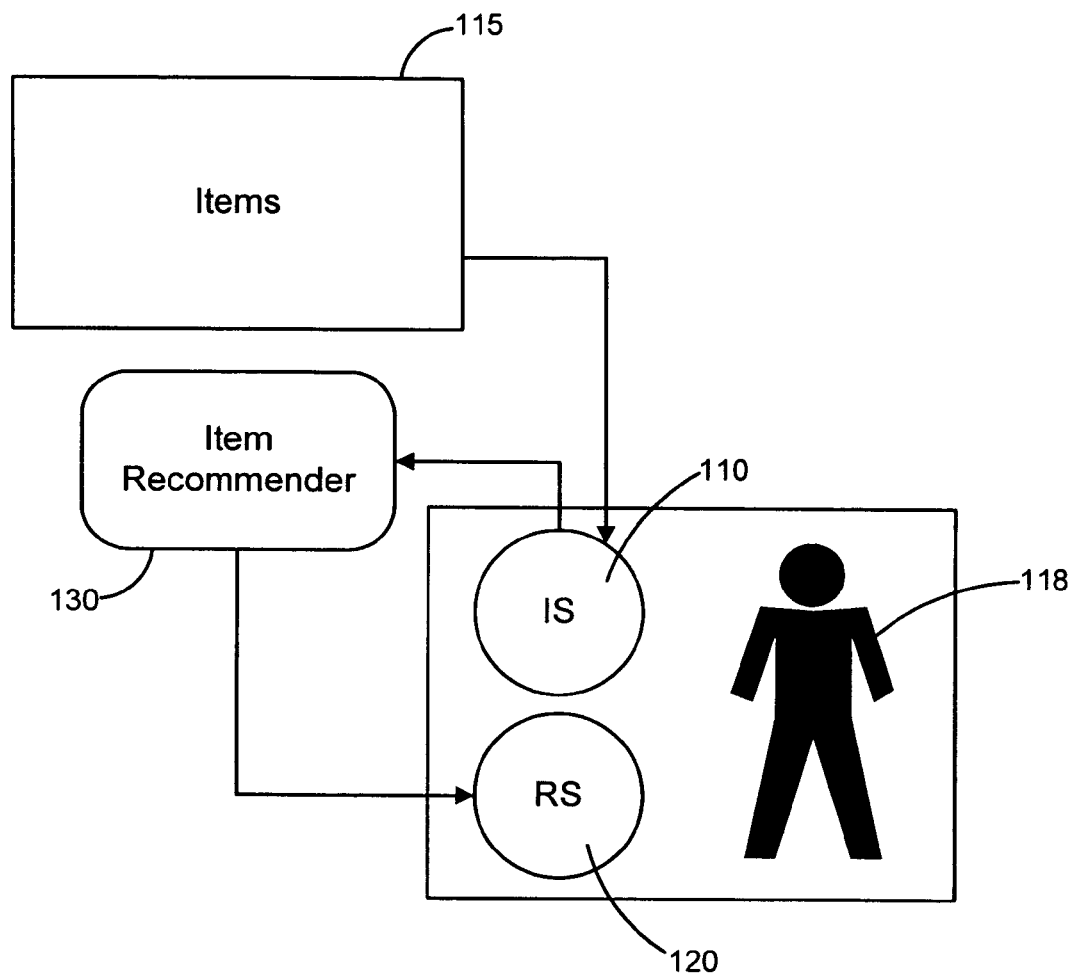
FIG. 1 is a diagram showing the basic components and sources for a user profile according to one embodiment.

The user recommender may be capable of selecting relevant users for a given target user. To do so, users should be comparable entities. The component that defines a user in a community may be referred to as the user profile. Thus, a user profile may be defined by defining two sets, such that comparing two users will be a matter of intersecting their user profile sets. For example, with reference to FIG. 1, the first set may be the "items set," referenced at 110 in FIG. 1, which may contain the most relevant items 115 for a particular user 118. The second set may be the "recommendations set," referenced at 120 in FIG. 1, which may contain the most relevant recommended items for user 118. The items set 110 can be deduced by the item usage and/or interaction of a certain user with certain items, whereas the recommendations set can be deduced by using an item recommender 130. In some cases, the items set 110 can be used as the input for the recommender 130, thereby obtaining a recommendations set as the output.

AN EXAMPLE OF AN ITEM RECOMMENDER

A system identifies a new set of recommended media items in response to an input set of media items. The system employs a knowledge base consisting of a collection of mediasets. Mediasets are sets of media items, which are naturally grouped by users. They reflect the users subjective judgments and preferences. The recommendation is computed using metrics among the media items of a knowledge base of the system. This knowledge base comprises collections of mediasets from a community of users. A mediaset is not a collection of media items or content. Rather, it is a list of such items, and may include various metadata.

The mediasets of the knowledge base define metrics among items. Such metrics indicate the extent of correlation among media items in the mediasets of the knowledge base. Preferably, the methods of the present invention are implemented in computer software.

Various different metrics between and among media items can be generated from the knowledge base of mediasets. Such metrics can include but are not limited to the follow examples:
   a) Pre-concurrency (for ordered mediasets) between two items is computed as the number of times a given item precedes the other item in the mediasets of the knowledge base.
   b) Post-concurrency (for ordered mediasets) between two items is computed as the number of times an item follows another item in the mediasets of the knowledge base.
   c) Co-concurrency between two items is computed as the number of times the items appear together in a mediaset.
   d) Metadata similarities may be computed as well by considering keywords associated with the media items such as artist, actor, date, etc.
   e) Combinations of the previous metrics can be useful.
   f) Combinations of the previous metrics applying transitivity.

Such metrics can be represented in an explicit form that directly associates media items with other media items. For each media item of the input set, the system retrieves n media items with highest metrics. These media items are called candidates. Then, the recommended set of media items is a subset of the candidates that maximize an optimization criterion. Such criterion can be simply defined using the metrics of the knowledge base of the system. Furthermore, such criterion can also include filters including but not limited to:
   a) Filters that the user expresses to focus the recommendation only on a determined type of items.
   b) Filters that the user expresses to focus the recommendations on items that meet certain keyword-based criteria, such as a specific artist/s, year/s, genre/s, etc.
   c) Filters that personalize the recommendations to the user. This kind of filtering includes recommending only items that the user knows about, or only items that the user does not know about, etc.

Additional aspects and advantages will be apparent from the following detailed description of preferred embodiments, which proceeds with reference to the accompanying drawings.

The item recommender preferably comprises or has access to a knowledge base which is a collection of mediasets. A mediaset is a list of media items that a user has grouped together. A media item can be almost any kind of content; audio, video, multi-media, etc., for example a song, a book, a newspaper or magazine article, a movie, a piece of a radio program, etc. Media items might also be artists or albums. If a mediaset is composed of a single type of media items it is called a homogeneous mediaset, otherwise it is called a heterogeneous mediaset. A mediaset can be ordered or unordered. An ordered mediaset implies a certain order with respect to the sequence in which the items are used[1] by the user. Note again that a mediaset, in a preferred embodiment, is a list of media items, i.e. meta data, rather than the actual content of the media items. In other embodiments, the content itself may be included. Preferably, a knowledge base is stored in a machine-readable digital storage system. It can employ well-known database technologies for establishing, maintaining and querying the database.

[1] Depending on the nature of the item, it will be played, viewed, read, etc.

In general, mediasets are based on the assumption that users group media items together following some logic or reasoning, which may be purely subjective, or not. For example, in the music domain, a user may be selecting a set of songs for driving, hence that is a homogeneous mediaset of songs. In this invention, we also consider other kinds of media items such as books, movies, newspapers, and so on. For example, if we consider books, a user may have a list of books for the summer, a list of books for bus riding, and another list of books for the weekends. A user may be interested in expressing a heterogeneous mediaset with a mix of books and music, expressing (impliedly) that the listed music goes well with certain books.

A set of media items is not considered the same as a mediaset. The difference is mainly about the intention of the user in grouping the items together. In the case of a mediaset the user is expressing that the items in the mediaset go together well, in some sense, according to her personal preferences. A common example of a music mediaset is a playlist. On the other hand, a set of media items does not express necessarily the preferences of a user. We use the term set of media items to refer to the input of the system of the invention as well as to the output of the system.

A metric M between a pair of media items i and j for a given knowledge base k expresses some degree of relation between i and j with respect to k. A metric may be expressed as a "distance," where smaller distance values (proximity) represent stronger association values, or as a similarity, where larger similarity values represent stronger association values. These are functionally equivalent, but the mathematics are complementary. The most immediate metric is the co-concurrency (i, j, k) that indicates how many times item i and item j appear together in any of the mediasets of k. The metric pre-concurrency (i, j, k) indicates how many times item i and item j appear together but i before j in any of the mediasets of k. The metric post-concurrency (i, j, k) indicates how many times item i and item j appear together but only i after j in any of the mediasets of k. The previous defined metrics can also be applied to considering the immediate sequence of i and j. So, the system might be considering co/pre/post-concurrencies metrics but only if items i and j are consecutive in the mediasets (i.e., the mediasets are ordered). Other metrics can be considered and also new ones can be defined by combining the previous ones.

A metric may be computed based on any of the above metrics and applying transitivity. For instance, consider co-concurrency between item i and j, co(i,j), and between j and k, co(j,k), and consider that co(i,k)=0. We could create another metric to include transitivity, for example $d(i,k)=1/co(i,j)+1/co(j,k)$. These type of transitivity metrics may be efficiently computed using standard branch and bound search algorithms. This metric reveals an association between items i and k notwithstanding that i and k do not appear within any one mediaset in K.

A matrix representation of metric M, for a given knowledge base K can be defined as a bidimensional matrix where the element M(i, j) is the value of the metric between the media item i and media item j.

A graph representation for a given knowledge base k, is a graph where nodes represent media items, and edges are between pairs of media items. Pairs of media items i, j are linked by labeled directed edges, where the label indicates the value of the similarity or distance metric M(i,j) for the edge with head media item i and tail media item j.

Figure 12:
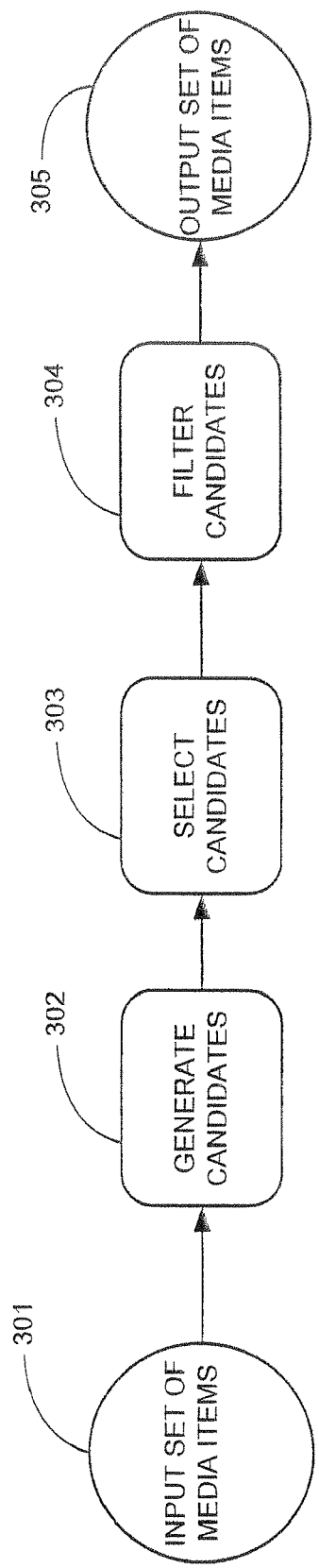
FIG. 12 is a block diagram of one method for selecting a set of media items corresponding to an initial set of media items in accordance with an embodiment of the invention.

One embodiment of the recommender is illustrated by the flow diagram shown in FIG. 12. This method accepts an input set 301 of media items. Usually, this is a partial mediaset, i.e. a set of media items (at lease one item) that a user grouped together as a starting point with the goal of building a mediaset. A first collection of candidate media items most similar to the input media items is generated by process 302 as follows.

Figure 13:
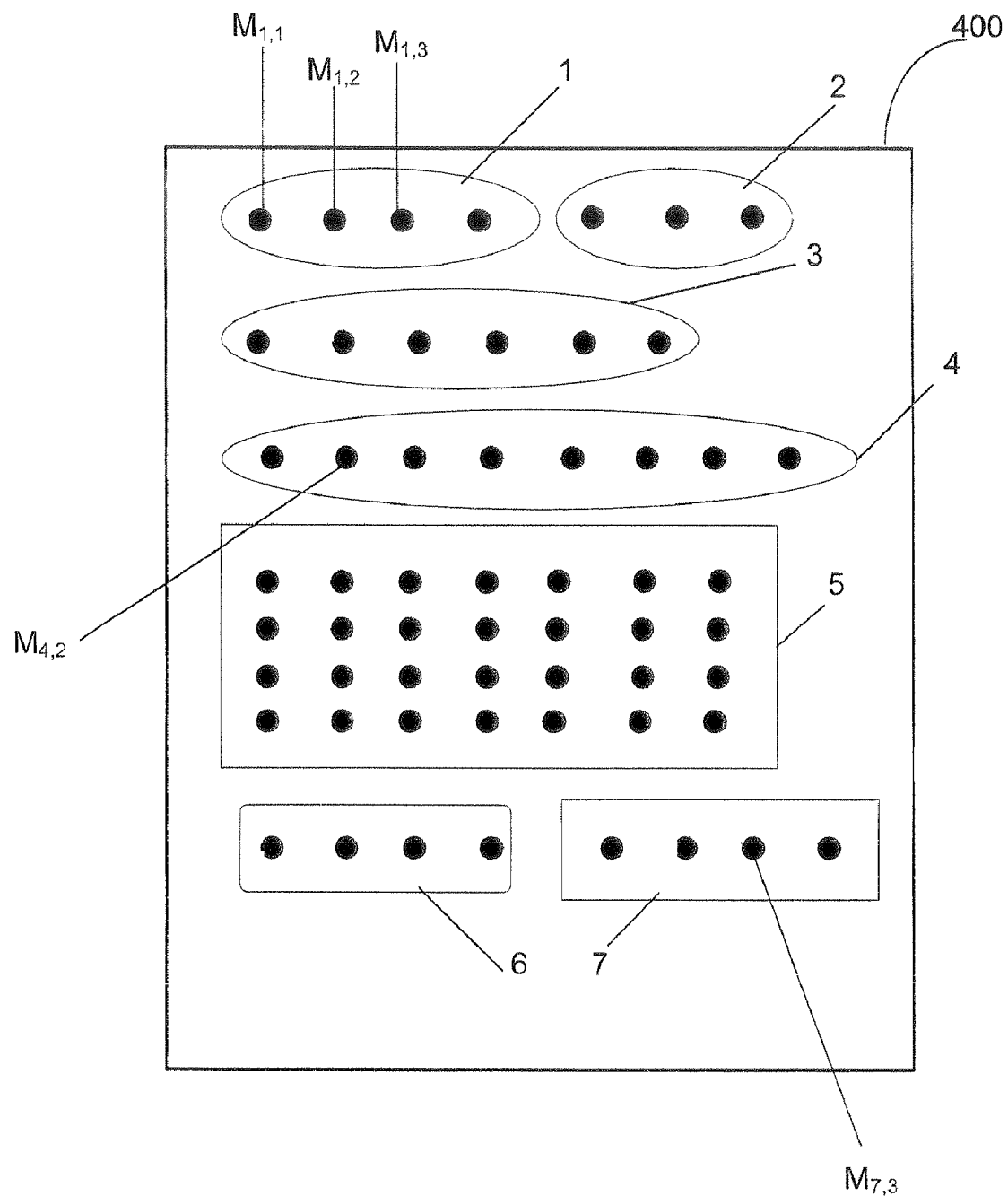
FIG. 13 is a simplified, conceptual diagram of a knowledge base or database comprising a plurality of mediasets.

As a preliminary matter, a pre-processing step may be carried out to analyze the contents of an existing knowledge base. This can be done in advance of receiving any input items. As noted above, the knowledge base comprises an existing collection of mediasets. This is illustrated in FIG. 13, which shows a simplified conceptual illustration of a knowledge base 400. In FIG. 13, the knowledge base 400 includes a plurality of mediasets, delineated by rectangles [or ovals] and numbered 1 through 7. Each mediaset comprises at least two media items. For example, mediaset 2 has three items, while mediaset 7 has five items. The presence of media items within a given mediaset creates an association among them.

Pre-processing analysis of a knowledge base can be conducted for any selected metric. In general, the metrics reflect and indeed quantify the association between pairs of media items in a given knowledge base. The process is described by way of example using the co-concurrency metric mentioned earlier. For each item in a mediaset, the process identifies every other item in the same mediaset, thereby defining all of the pairs of items in that mediaset. For example, in FIG. 13, one pair in set 1 is the pair M(1,1)+M(1,3). Three pairs are defined that include M(1,1). This process is repeated for every mediaset in the knowledge base, thus every pair of items that appears in any mediaset throughout the knowledge base is defined.

Next, for each pair of media items, a co-concurrency metric is incremented for each additional occurrence of the same pair of items in the same knowledge base. For example, if a pair of media items, say the song "Uptown Girl" by Billy Joel and "Hallelujah" by Jeff Buckley, appear together in 42 different mediasets in the knowledge base (not necessarily adjacent one another), then the co-concurrency metric might be 42 (or some other figure depending on the scaling selected, normalization, etc. In some embodiments, this figure or co-concurrency "weight" may be normalized to a number between zero and one.

Figure 11A:
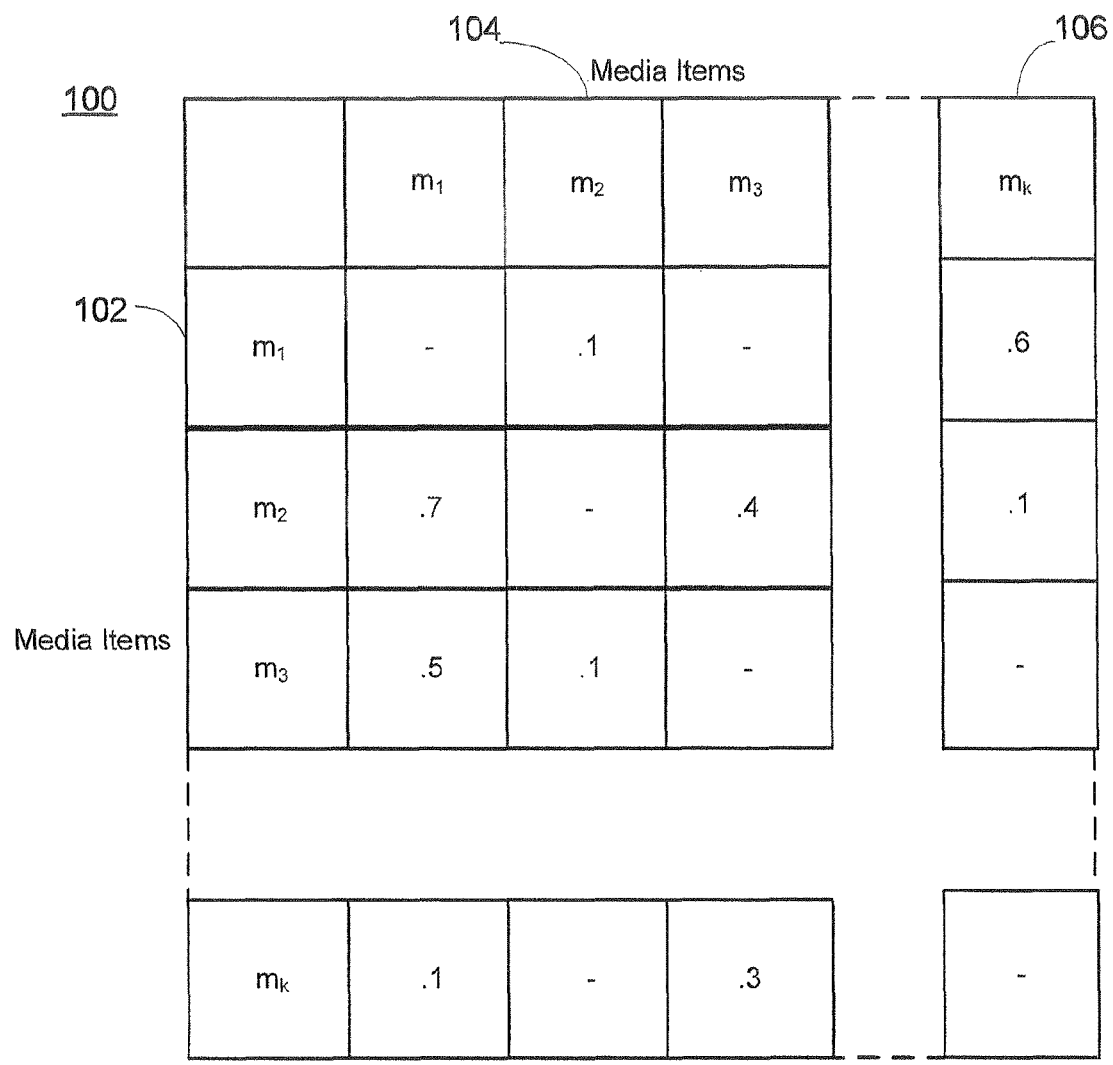
FIG. 11A is a representation in matrix form of a metric describing the similarity values between collections of media items.

Referring now to FIG. 11A, matrix 100 illustrates a useful method for storing the metric values or weights for any particular metric. Here, individual media items in the knowledge base, say $m_1, m_2, m_3 \ldots m_k$ are assigned corresponding rows and columns in the matrix. In the matrix, the selected metric weight for every pair of items is entered at row, column location x,y corresponding to the two media items defining the pair. In FIG. 11A, the values are normalized.

Now we assume an input set of media items is received. Referring again to process step 302, a collection of "candidate media items" most similar to the input media items is generated, based on a metric matrix like matrix 100 of FIG. 11A. For instance, for each media item, say (item $m_2$) in the input set 301, process 302 could add to a candidate collection of media items every media item ($m_1, m_3 \ldots m_k$ in FIG. 1A) that has a non-zero similarity value, or exceeds a predetermined threshold value, in the corresponding row 102 of metric matrix 100 for the media item $m_2$, labeling each added media item with the corresponding metric value (0.7, 0.4 and 0.1, respectively). See the edges in FIG. 11B. For each media item in the input set of size m, process 302 selects n media items as candidates; thus the aggregation of all the candidates produces a set of at most m*n media items.

Process 303 receives the candidate set from process 302 which contains at the most m*n media items. This component selects p elements from the m*n items of the candidate set. This selection can be done according to various criteria. For example, the system may consider that the candidates should be selected according to the media item distribution that generated the candidate set. This distribution policy may be used to avoid having many candidates coming from very few media items. Also, the system may consider the popularity of the media items in the candidate set. The popularity of a media item with respect to a knowledge base indicates the frequency of such media item in the mediasets of the knowledge base.

Finally, from the second collection of [p] media items, a third and final output set 305 of some specified number of media items is selected that satisfy any additional desired external constraints by a filter process 304. For instance, this step could ensure that the final set of media items is balanced with respect to the metrics among the media sets of the final set. For example, the system may maximize the sum of the metrics among each pair of media items in the resulting set. Sometimes, the system may be using optimization techniques when computation would otherwise be too expensive. Filtering criteria such as personalization or other preferences expressed by the user may also be considered in this step. In some applications, because of some possible computational constraints, these filtering steps may be done in the process 303 instead of 304. Filtering in other embodiments might include genre, decade or year of creation, vendor, etc. Also, filtering can be used to demote, rather then remove, a candidate output item.

Figure 11B:
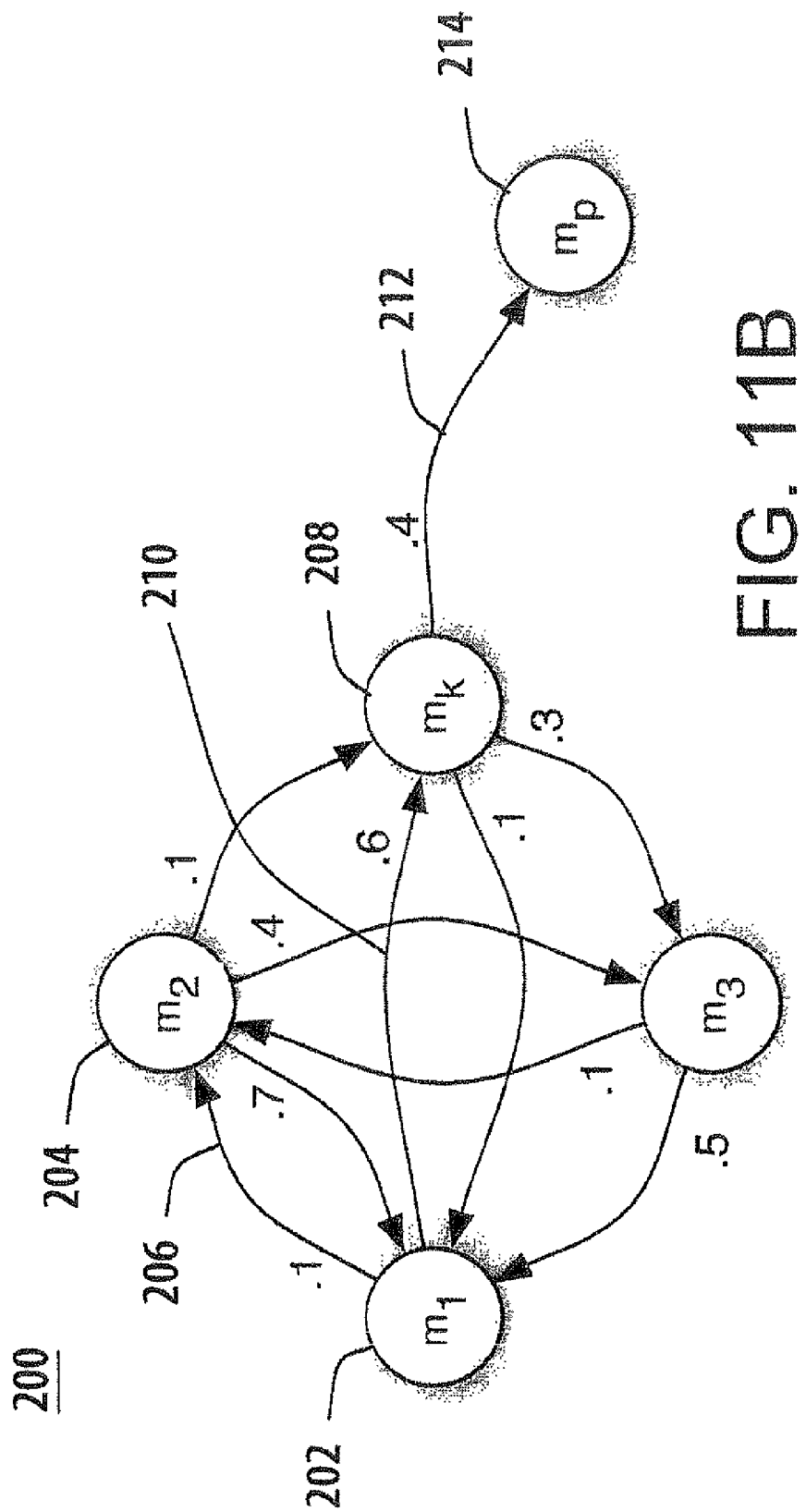
FIG. 11B provides a weighted graph representation for the associations within a collection of media items. Each edge between two media items is annotated with a weight representing the value of the metric for the similarity between the media items.

In another embodiment or aspect of the invention, explicit associations including similarity values between a subset of the full set of media items known to the system, as shown in graph form in FIG. 11B, may be used. To illustrate, if the similarity value between a first media item 202, generally denoted below by the index i, and a second media item, say 214, generally denoted below by the index j, is not explicitly specified, an implicit similarity value can instead be derived by following a directed path such as that represented by edges 210 and 212 from the first media item to an intermediate item, and finally to the second media item of interest, in this example item $m_p$. Any number of intermediate items can be traversed in this manner, which we call a transitive technique. The list of similarity values M(i, i+1), M(i+1, i+2), ..., M(i+k, j) between pairs of media items along this path through the graph are combined in a manner such that the resulting value satisfies a definition of similarity between media item i and media item j appropriate for the application. For example, the similarity M(i,j) might be computed as:

$$M(i,j) = \min\{M(i,i+1), M(i,i+2), \ldots, M(i+k,j)\}$$

or $$M(i,j) = M(i,i+1) * M(i,i+2) * \ldots * M(i+k,j)$$

Other methods for computing a similarity value M(i,j) for the path between a first media item i and a second, non-adjacent media item j where the edges are labeled with the sequence of similarity values M(i, i+1), M(i+1, i+2), ..., M(i+k, j) can be used. From the user standpoint, this corresponds to determining an association metric for a pair of items that do not appear within the same mediaset.

Using an Item Recommender to Generate a Recommendation Set

The items described in the following examples and implementations will be for musical or other media items. However, it should be understood that the implementations described herein are not item-specific and may operate with any other type of item used/shared by a community of users.

For musical or multimedia items (tracks, artists, albums, etc.), users may interact with the items by using them (listening, purchasing, etc.). The sets in such embodiments will be referred to as "musical sets," as they contain musical items. These sets will therefore be referred to as the "Music Set" and the "Recommendations Set."

The Music Set is the musical set formed by the items the user is listening to. A User A's Music Set will be denoted herein as $M_a$.

The Recommendations Set is the musical set formed by the items the user is being recommended. A User A's Recommendations Set will be denoted herein as $R_a$.

To compare two user profiles, the intersection between one or more of their respective sets may be analyzed. A variety of different metrics may also be applied to set intersections to provide useful data. Some such metrics will describe relations between users. For example, four elementary intersecting cases are:

$M_a \cap M_b$, $M_a \cap R_b$, $R_a \cap M_b$, and $R_a \cap R_b$. Analyzing these cases may lead to complex cases that may be labeled or classified as different relations. For example, in one implementation, four relevant relations may be extracted:

Peer: If $M_a$ intersects $M_b$ sufficiently, B is considered a "Peer" of A.

Guru: If $M_a$ intersects $R_b$ sufficiently, B is considered a "Guru" of A.

Peer-Guru: Peer condition plus Guru condition. B is considered a "Peer-Guru" of A.

Follower: If $R_a$ intersects $M_b$ sufficiently, B is considered a "Follower" of A.

Peer relation may be relevant because it gives the target user another user whose musical (or other item) library is similar in some way to the target user's musical library. Guru relation may be relevant because it gives the target user another user whose musical library contains music the target user may enjoy discovering. Peer-Guru may be relevant because it gives the target user both the affinity and the discovery experiences of the Peer and Guru relations, respectively, toward one or more recommended users. Follower relation may be relevant because it gives the user the chance to know which users may be influenced by him or her.

Illustrative concrete metrics will now be disclosed, from which the aforementioned relations, for example, can be deduced. A metric may be a function that takes as input two (or more) user profiles and produces a measurable result as an output. The metrics discussed below are unidirectional, meaning that the order of the parameters can change the result.

The "Affinity" metric answers the question, "How much does $M_a$ intersect with $M_b$?" In other words, how much "affinity experience" does user A have towards user B?

The "Discovery" metric answers the question, "How much does $R_a$ intersect with $M_b$?" In other words, how much "discovery experience" does user A have towards user B?

The "Guidance" metric answers the question, "How much does $M_a$ intersect with $R_b$?" In other words, how much can user A guide user B?

Figure 2:
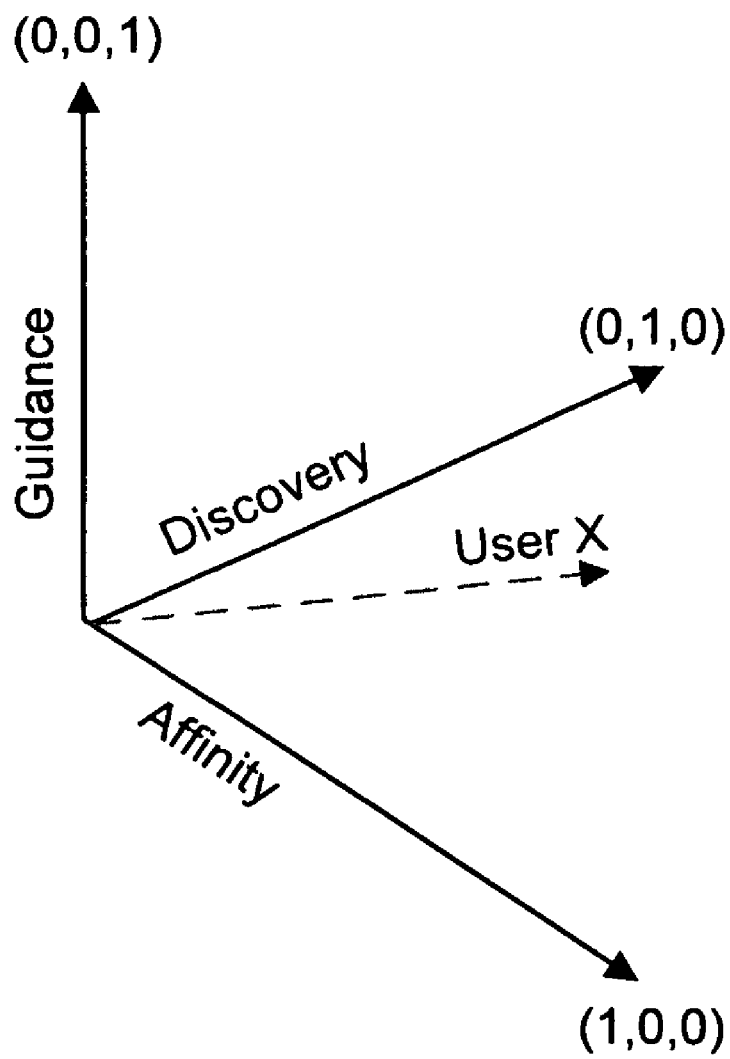
FIG. 2 depicts a graph showing the position of a target user "X" in ADG Space according to one embodiment.

With these metrics. Peer relations can be found by maximizing the Affinity metric, Guru relations can be found by maximizing the Discovery metric, Peer-Guru relations can be found by maximizing both the Affinity and the Discovery metric, and Follower relations can be found by maximizing the Guidance metric. A total relevance of one user toward another user can be computed, for example, by defining a function that operates with each (or greater than one) of the metrics. For a target user, all the other users in the community can be located as points into a three-dimensional space ("ADG Space") where X=Affinity, Y=Discovery, and Z=Guidance. Defining the metrics as to return a number between [0,1], all the users in the community can be enclosed within a cube of 1×1×1 in that space. FIG. 2 illustrates the position of a sample target user "X" in ADG Space.

To implement a user recommender following the conceptual model explained, an under-lying system may be built. One such system may be configured such that:

1. There is a user community and an item recommender from which from which a user profile for each user in the community can be extracted. This information may be fed by one or more data sources.

2. There is an implementation of the user recommender that builds the data and the operations of the model, and collects the data from the data sources.

Figure 3:
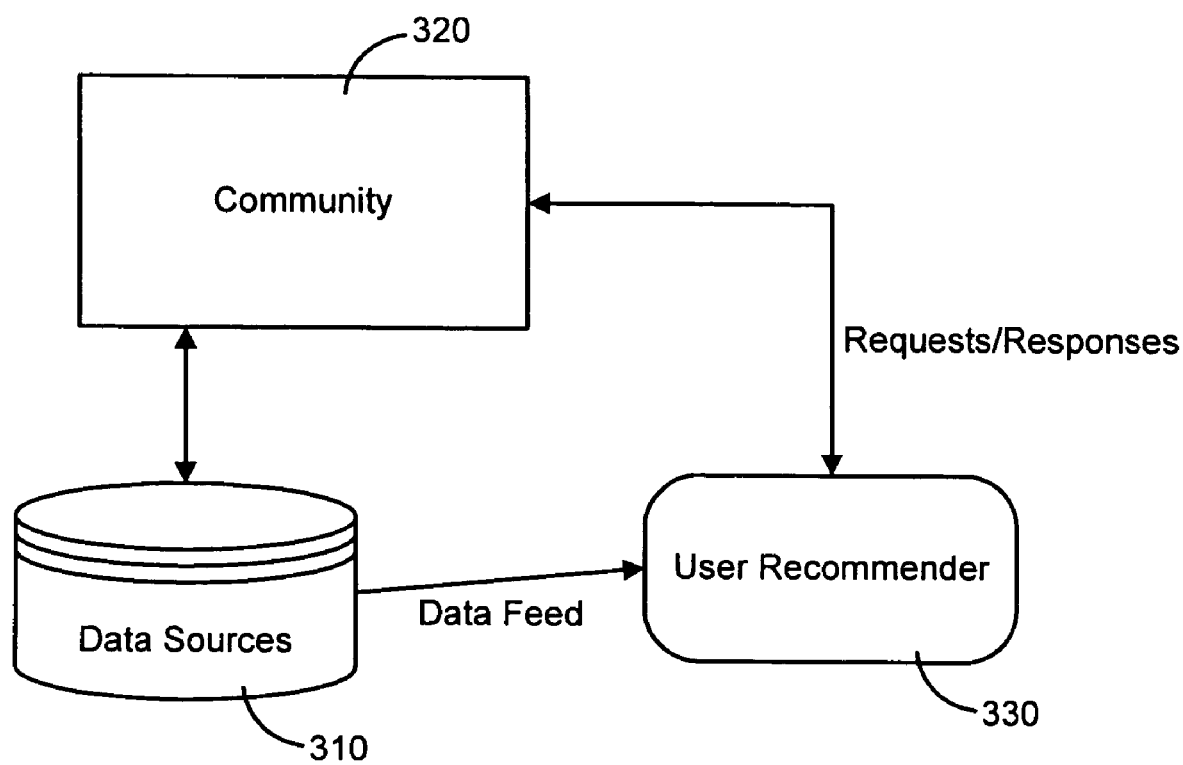
FIG. 3 is a diagram showing a basic architecture schema for a user recommender according to one embodiment.

A basic architecture schema for a user recommender according to one implementation is shown in FIG. 3. As shown in the figure, data sources 310 provide data to (and receive data from) a user community 320. Data sources 310 may also provide a data feed to a user recommender 330. User recommender 330 interacts with the user community 320. In particular, requests for user recommendations may be received from the user community 320 and recommended users may, in turn, be provided to the user community 320. Of course, it is contemplated that some implementations may rely upon receiving requests from users to generate recommended user sets and other implementations may generate such sets and offer them to users in the community without first receiving user requests.

It may also be desirable to provide a scalable architecture solution. Given a request, it may not be feasible to compare the target user to all of the users in the community (the response time may grow linearly with the number of users). A number of solutions to this problem may be implemented. For example:

1. The user data may be clusterized and the target user compared to the right cluster.

2. A fixed number or subset of users may be selected from the user community. This subset of users may be referred to as "Recommendable Users" and the target user(s) may be compared to that size-fixed set. The Recommendable Users may be selected by some procedure that allows the system to recommend the most interesting users in the community.

A musical set entity can be modeled as a sparse vector of an N-dimensional space where N is the total number of musical items in our universe. Each dimension refers to a different item, whereas each concrete value refers to the relevance of that item. Adding a relevance value for each item allows the underlying system or implementation to be aware of the most relevant items for a certain user.

In some implementations, the items can be music tracks. However, in such embodiments, intersections between items in two user's sets may be less probable (due to a sparsity problem). In addition, such intersections may be computationally expensive.

These issues may be addressed in some embodiments by instead working on the artist level. The probability of intersection of artists instead of tracks is higher. On the other hand, the relevance value may depend on the data source from which the items are extracted. A normalization process may therefore be used so that all the relevance values finally belong to a known value scale, such as a qualitative value scale.

Figure 4:
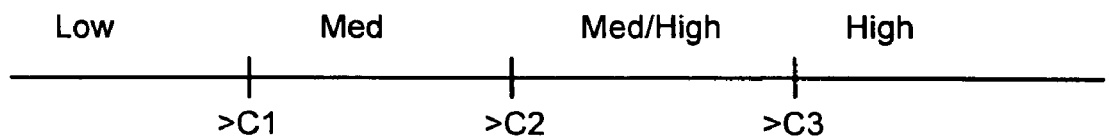
FIG. 4 depicts a qualitative scale indicative of the relevance of particular items to a particular user within a user community.

For example, FIG. 4 depicts a qualitative scale indicative of the relevance of particular items, such as artists, to a particular user. Artists (or other items) with a relevance value of less than C1 for a given user will be considered "Low," those with a relevance value between C1 and C2 will be considered "Medium," those with a relevance value between C2 and C3 will be considered "Medium/High," and those with a relevance value greater than C3 will be considered "High."

Details and examples of an illustrative normalization process are discussed later, along with other approaches for finding the relevance of a certain item for a certain user.

A user entity can be modeled as an entity with an unique ID plus two musical set entities, so that we have all the data needed to compute intersections according to the conceptual model discussed herein.

Some operations that may be implemented in some embodiments of the invention will now be discussed. The primitive operations are those that are needed to compare two user entities, and that involve intersections between musical sets. For example:

1. The size of a musical set can be represented as:

$$|M_u| = \sum_{k=1}^{N} M_{uk}$$

Where $M_{uk}$ is the relevance value of the item k in the set $M_u$.

2. The size of an intersection can be represented as:

$$|M_u \cap M_{u'}| = \sum_{k=1}^{M} \min(M_{uk}, M_{u'k})$$

For all those M items that are in common in $M_u$ and $M_{u'}$.

3. The Affinity, Discovery, and Guidance metrics can be represented as follows.

One approach to the Affinity metric consists of calculating the size of $M_u$ with $M_{u'}$ and normalizing it by the size of $M_u$, as follows:

$$\text{Affinity}(U, U') = \frac{|M_u \cap M'_u|}{|M_u|}$$

As another possibility, if we consider that the intersection of $R_u, R_{u'}$ is somehow an affinity measure, then we can add this factor to the whole formula, weighting it by a K factor and thereby normalizing the measure:

$$\text{Affinity}(U, U') = \frac{\frac{|M_u \cap M_{u'}|}{|M_u|} + \frac{|R_u \cap R_{u'}|}{K \cdot |R_u|}}{1 + \frac{1}{K}}$$

Note that a high Affinity of U to U' does not necessarily mean a high Affinity of U' to U.

Corresponding formulas for Discovery and Guidance are as follows:

$$\text{Discovery}(U, U') = \frac{|R_u \cap R'_u|}{|R_u|}$$

$$\text{Guidance}(U, U') = \frac{|M_u \cap R'_u|}{|R'_u|}$$

Note that it is always true that Discovery(U, U')=Guidance (U', U).

The following model operations are illustrative global operations that may be implemented in the user recommender that, by means of using primitive operations, allow it to compute the desired result.

getBestUsers(User, Requirement):

By computing a certain set of metrics, a set of recommended users may be returned for the target user. The Requirement may specify what kind of users are to be recommended and what metrics are to be considered. A general algorithm for this function may be as follows:

1. Let TU be the Target User, RUS the Recommendable Users Set and REQ the Requirement of the request.
2. For each User U in RUS, compute the necessary Metrics (TU,U) according to REQ and store the result, together with the compared user U of RUS.
3. Sort RUG by the result of the comparision so that at the beginning of the list we have the best users according to REQ.
4. Return a sublist of RUS, starting at the beginning.

getRelevance(User1, User2):

By computing all the metrics of User1 toward User2, a floating number may be returned by computing a function performing some calculation with all the metric values, which answers the question: How relevant is User2 for User1? This function may, for example, calculate the length of the vector in the ADG Space.

The user recommender may be implemented as a Java Web Module. This module may be deployed, for example, as a webapp in a Tomcat environment. In one implementation, the Data Sources for such an implementation may be as follows:

1. "Reach" API: Returns playcount data for each user. Some implementations may be able to deduce a musical set from this data.
2. "UMA" Recommender: Returns recommended items for a set of items. Some implementations may be able to deduce a musical set from this data using as input, for example, the Music Set of the user profile, and consequently obtaining the Recommendations Set of the user profile explained above.
3. "KillBill" API: Returns some extra information about a user, for example, its alias.

One scalable solution is to obtain the best N users of the community through the Reach API and make them Recommendable Users. In some implementations, a CLUTO clustering program may be used. CLUTO programs are open source software, and are available for download at: <http://glaros.dtc.umn.edu/gkhome/cluto/cluto/download>. In other implementations, a WEKA clustering program may be used. WEKA is also an open source program, and is available for download at: <http://www.cs.waikato.ac.nz/ml/weka/>. A file-cache system may also be built and used in some implementations.

Therefore, only the best users may be recommended, even though recommendations may be provided to all the users. If a user is not in the best N set, then the user recommender may ask in real-time for the user profile of that user to be added to the data sources.

A Java implementation may consist of a set of classes the logic of which can be partitioned as follows:

Servlet View: Where all the servlet request/response logic is enclosed.

Recommender View: Where the main operations are performed by the singleton Recommender, often delegating them to a Manager.

Manager View: Where all the operations are actually performed, by using the Core classes.

Core View: Where the foundations of the model are established by a set of Java Classes.

Figure 5:
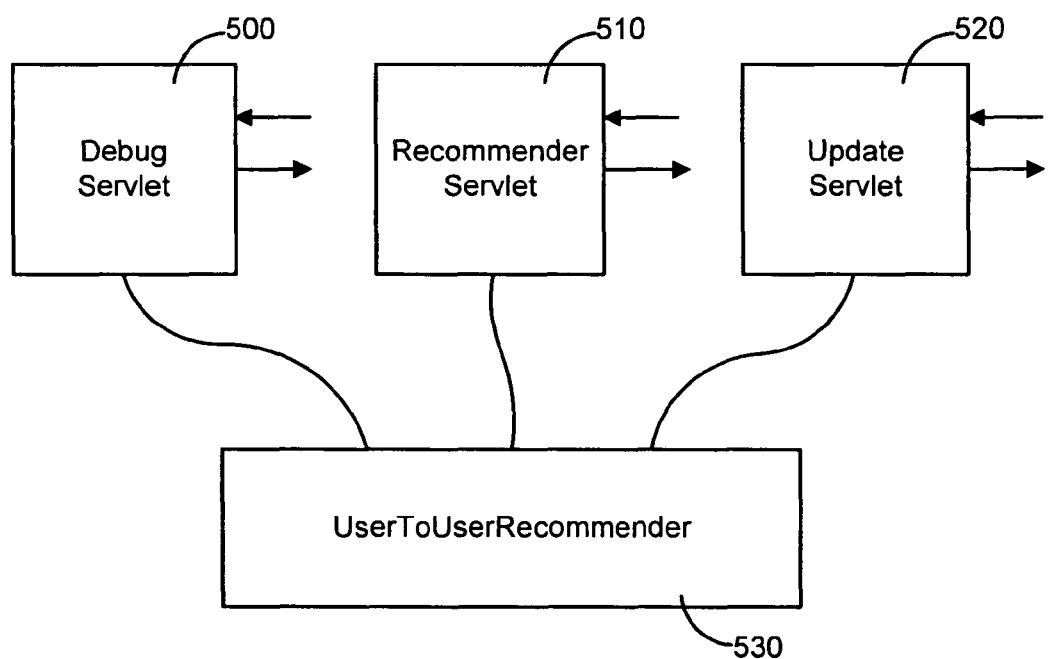
FIG. 5 is a diagram showing a Servlet View of one embodiment of a user recommender system.

The aforementioned "Views" will now be described in greater detail. The user recommender may be implemented as a set of HTTP Servlets. The recommender may be implemented as a Singleton Instance, which may be used by three different servlets, as shown in FIG. 5.

1. The Debug Servlet 500 attends debug commands. For instance, action=stats may perform a plot of the recommender 530 internal memory statistics.

2. The Recommender Servlet 510 attends the recommendation requests according to the model operations explained previously.

3. The Update Servlet 520 performs the update process on the user data.

The Recommender may be a singleton class mainly formed by a manager and a request cache. Concurrent accesses to the cache may also be controlled by semaphores to avoid inconsistent information. For example, if the Debug Servlet sends a flush cache command, if there is a recommendation request waiting to get the result from cache, a null response can be received if the request is processed after the flush has been performed.

In some implementations, the general algorithm for accessing the request cache is as follows:

1. Close the semaphore if it is opened; otherwise wait.
2. Is the result in the cache?
3. If so, take the result out from the cache.
4. Open the cache semaphore.

The Cache may be implemented in a Hash Map, the keys of which are string request hashes and the values of which are a request result. The string request hashes may be calculated to obtain a unique string for each set of parameters that may produce a different result.

Figure 6:
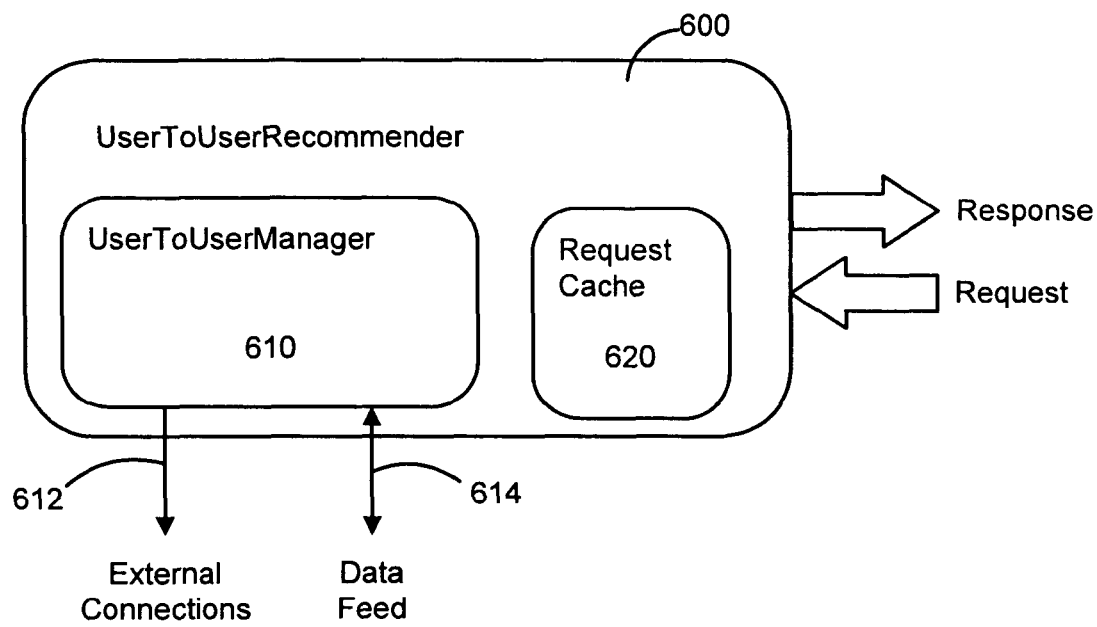
FIG. 6 is a diagram showing a Recommender View of one embodiment of a user recommender system.

FIG. 6 shows an example of a user to user recommender 600 and its basic interactions with other elements of the system. Recommender 600 has a Manager 610 and a Request Cache 620. Manager 610 has one or more external connections, shown at 612, and a data feed, shown at 614.

Figure 7:
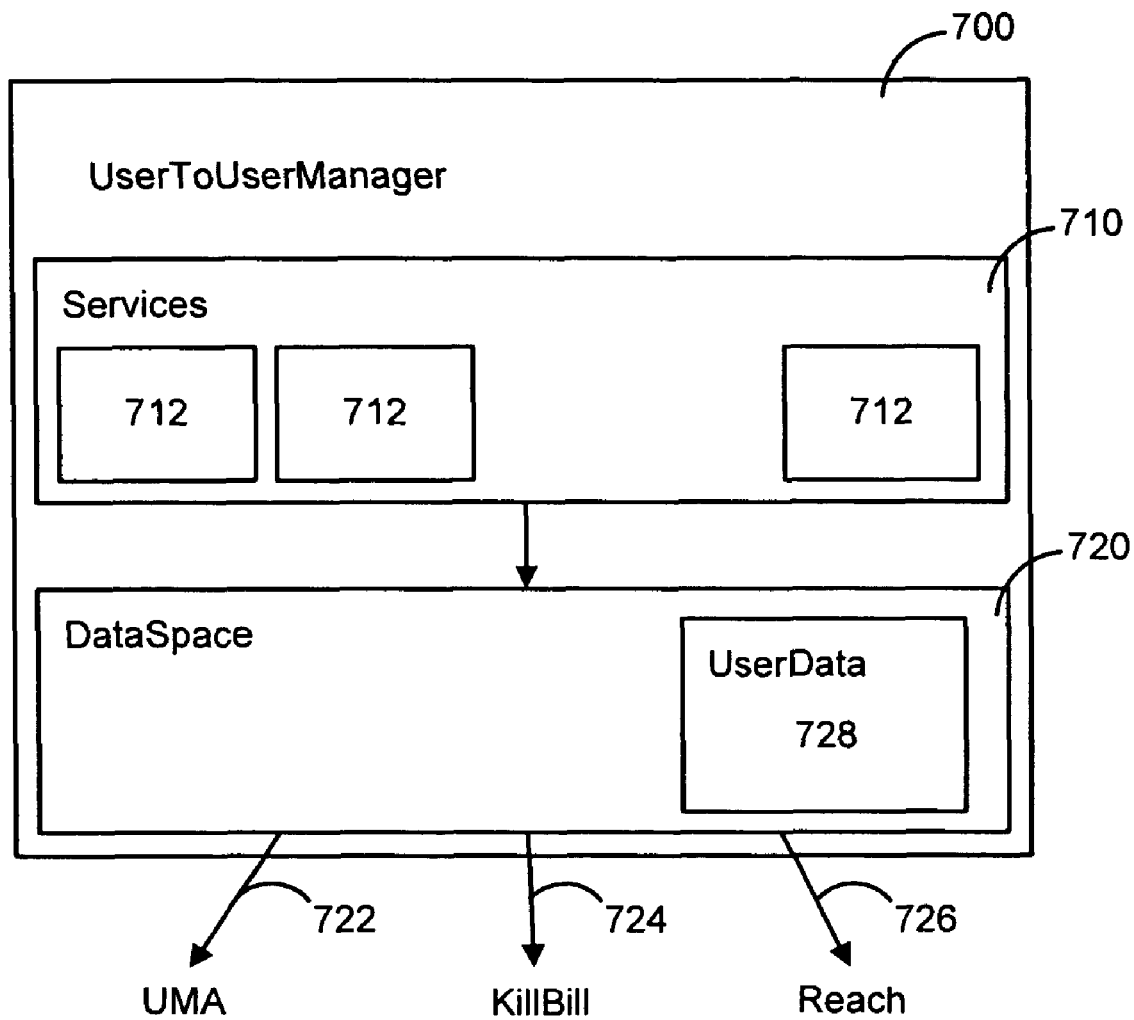
FIG. 7 is a diagram showing a Manager View of one embodiment of a user recommender system.

The Manager may be implemented as a singleton class with two layers—the service layer and the dataspace layer, as shown at 700 in FIG. 7.

The service layer 710 may contain singleton instances of services 712. Each service 712 may be used to perform a set of tasks of a particular type. For example, an "Update Service," containing all the logic for performing the update on the data, may be provided. A "Comparator Service," containing all the logic for performing comparators between the Data, may also be provided. These services may communicate directly with the dataspace layer 720.

The dataspace layer 720 may contain all the connections to external services (such as UMA 722, KillBill 724, and Reach 726) as well as the main memory structures 728 where the recommendable users are permanently stored.

Figure 8:
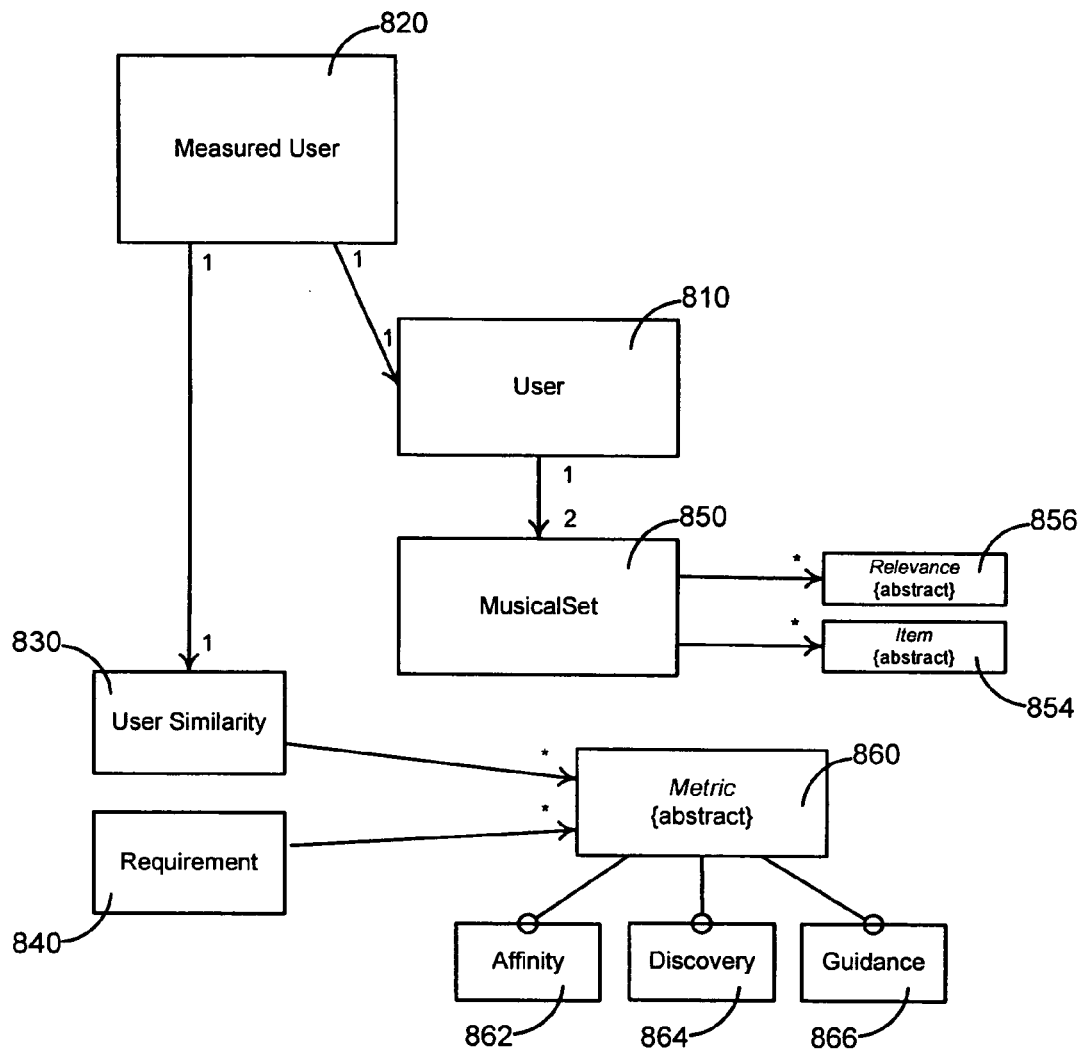
FIG. 8 is a core Unified Modeling Language (UML) diagram of one embodiment of a user recommender system.

The basic classes for some implementations are: User 810, MeasuredUser 820, UserSimilarity 830, and Requirement 840, as shown in FIG. 8. In such implementations, a Musical Set 850 for a user 810 may be implemented as a set of pairs (Item 854 and Relevance 856). Certain implementations of Item and Relevance are ArtistItem (containing Artist ID's) and SimpleRelevance (a magnitude between 1 and 3). There may also be an ItemFactory and a RelevanceFactory, the tasks of which are to create Item and Relevance objects, taking the name of the implementation as input. In such embodiments, the implementation of Item and Relevance can easily be changed at any stage of the project without affecting the other core classes.

When a user is compared to another user, we have a MeasuredUser 820, which is the compared user together with UserSimilarity 830 instances. A UserSimilarity 830 specifies how much of each Metric 860 is correlated with the target User. The client may also be able to specify a Requirement to maximize/minimize different metrics. The Affinity, Discovery, and Guidance Metrics are shown in FIG. 8 at 862, 864, and 866, respectively.

As described previously, the Affinity, Discovery and Guidance metrics may be implemented, but other metrics can also be implemented by extending the interface metric.

The interface metric specifies that each metric has to perform an intersection between two users, the result of which is parametrizable. The interface may also specify that each metric has to return a computation value measuring the relevance between two users according to the metric. This value may also be parameterizable, so that each metric is double-parameterized. The computation value may also be normalized between 0 and 1. As an example, a new metric "Age Affinity" could be implemented. This Metric might return a signed Integer comprising the difference between two user ages as the intersection and/or a String representing the qualitative age difference of one user to the other ("younger", "much younger," etc.). The normalized computation might be calculated so that 1 means the two users have the same age and 0 means the two users are too far apart in age to be considered related for purposes of the system.

In one example, a webapp was deployed in two production machines controlled by a load balancer. The number of recommendable users was about 1000 and the system was able to respond to more than 500 requests per day. A stress test was made with Apache Jmeter, a Java desktop application available for download at: <http://jakarta.apache.orq/site/downloads/downloads_jimeter.cqi>. In this test, several requests were sent to the server, and the response time increased linearly with the number of simultaneous requests. The test result numbers were as follows:

| Requests | Requests per second | Average Processing Time | Average Response Time |
|---|---|---|---|
| 100 | 1 | 60 ms | 290 ms |
| 200 | 2 | 110 ms | 370 ms |
| 1000 | 10 | 120 ms | 420 ms |
| 10000 | 100 | 500 ms | 1800 ms |

Figure 9:
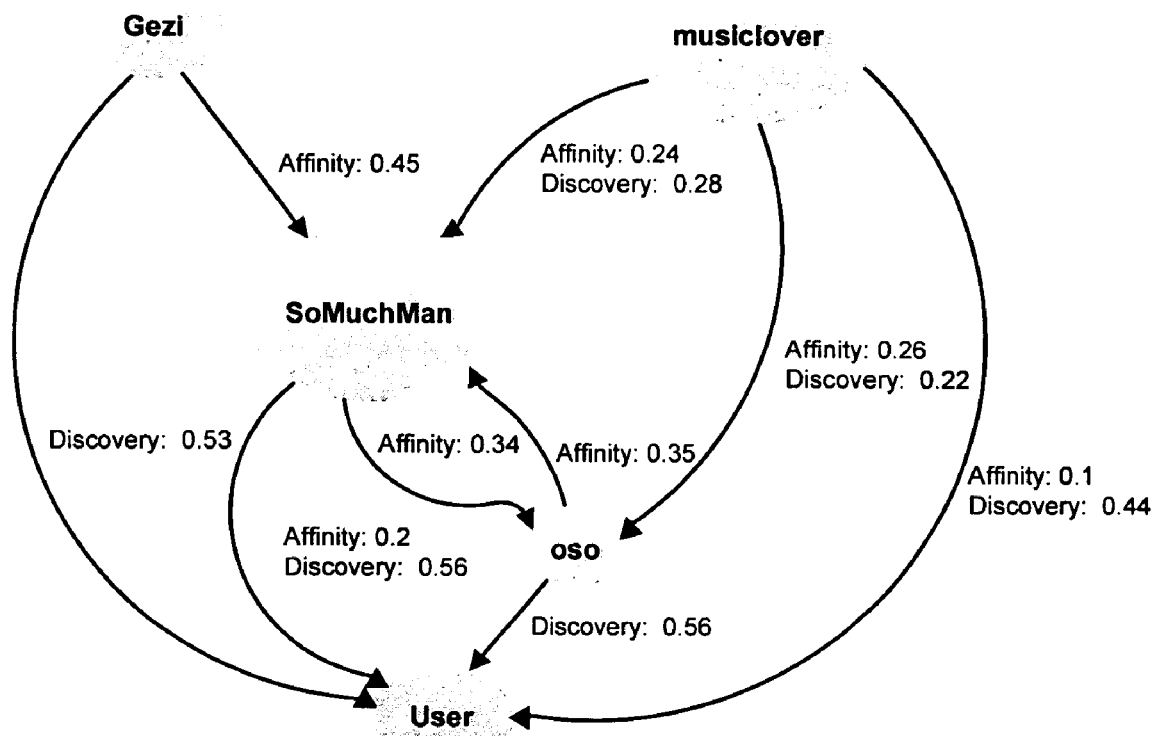
FIG. 9 is a diagram depicting an example of the information that can be extracted from a GraphPlotter tool used with one embodiment of a user recommender system.

In some implementations, a viewable graph can be plotted by using a GraphPlotter tool. FIG. 9 provides an example of the information that can be extracted from a GraphPlotter tool. As shown in FIG. 9, Discovery and/or Affinity values between various users in the user community are represented in the graph.

Additional details of particular implementations will now be described in greater detail. Let's suppose we have two users. A and B, with Music and Recommendation sets $M_a$, $R_a$ and $M_b$, $R_b$, respectively. If R is the output of an item recommender generated from input M, for some item recommenders it is always true that $$M \cap R = \emptyset$$

As forth previously, the four possible intersections are $M_a \cap M_b$, $M_a \cap R_b$, $R_a \cap M_b$, and $R_a \cap R_b$. The total number of cases is 12:

Peer relation: $M_a \cap M_b$. A and B have common musical tastes.

Peer-Brother relation: $M_a \cap M_b + R_a \cap R_b$. A and B have common musical tastes and may also have common musical tastes in the future.

Guru-follower relation: $M_a \cap R_b$. B can learn from A (A is a guru to B and B is a follower of A).

Hidden-peer relation: $R_a \cap R_b$. A and B may evolve to common musical tastes.

Peer-guru/Peer-follower relation: $M_a \cap M_b + M_a \cap R_b$. B can learn from A, but B has already learned something from A. This case may be treated as a special case of Peer or as a special case of Guru-follower. If treated as the first, then we can say that this is a "stronger" Peer (the second condition assures that the next "state" of user B's taste is also a Peer state between A and B), whereas if treated as the second, then it may be considered a "weaker" Guru-Follower relation (the follower will see some of his music in the Guru's music).

Peer-Brother-Guru/Peer-Brother-Follower relation: $M_a \cap M_b + M_a \cap R_b + R_b$. The same as above, but with intersection in recommendations.

Static Guru-Follower relation: $M_a \cap R_b + R_a \cap R_b$. B can learn from A and B will still learn from A if A moves towards the next state. It is a stronger case of Guru-Follower.

Crossing-trains relation: $M_a \cap R_b + R_a \cap M_b$. B learns from A and A learns from B. However, these users' next states are not going to intersect, so this is a strange case of Guru-Follower (because of being bidirectional).

Taxi Relation: $M_a \cap R_b + R_a \cap M_b + M_a \cap M_b$. The same as above but with intersection in music.

Meeting-trains relation: $M_a \cap R_b + R_a \cap M_b + R_a \cap R_b$. B learns from A, A learns from B, and their next state is going to intersect. If A or B moves to the next state, the other can still learn from him. If both move, then they are going to be Peers. This may be the strongest case of bidirectional Guru-Follower.

Perfect Connection Relation: $M_a \cap R_b + R_a \cap M_b + M_a \cap M_b + R_a \cap R_b$. Everything intersects.

There may also be ways for determining/calculating how relevant an artist is for a particular user. For example, if the system has playcounts of the artist for the user, the data may be normalized by setting absolute cut-off points such that certain numbers of playcounts can be considered "Low," certain other numbers of playcounts can be considered "Medium," and so on.

Alternatively, if the system has a set of playlists for the user, the number of times the artist appears in the playlists may be counted. The methodology may then proceed as described above (i.e., with cut-off points).

As another alternative, if the system has a recommended set, the relevance of the artist based on the position it occupies in the recommended list may be calculated and used in the analysis. Of course, this assumes that the recommender provides a ranked list of recommended artists.

In some implementations, users may further be classified by how frequently they listen to a given artist, how many songs the user has in his or her profile from the artist, and/or otherwise how familiar the user is with a given artist. For example, for each artist a user listens to, we have:

1. F: Frequency of listening; and
2. K: Knowledge (how many songs from this artist the user knows).

The values for F and K can be classified as High or Low. Listeners for a particular artist can therefore be classified as:

| Listener | Frequency | Knowledge |
|---|---|---|
| A | Low | Low |
| B | Low | High |
| C | High | Low |
| D | High | High |

In general, only listeners of the same type will match, but if we imagine these classifications as points on a perfect square (where 0 is Low and 1 is High). A is distance 1 to B and C, and distance $\sqrt{2}$ to D. Likewise, B is distance 1 to A and D, and distance $\sqrt{2}$ to C, and so on.

However, it may be the case that the frequency of listening is not as relevant as the knowledge. So one dimension can be made larger than the other, which makes the square become larger around the K dimension.

Figure 10:
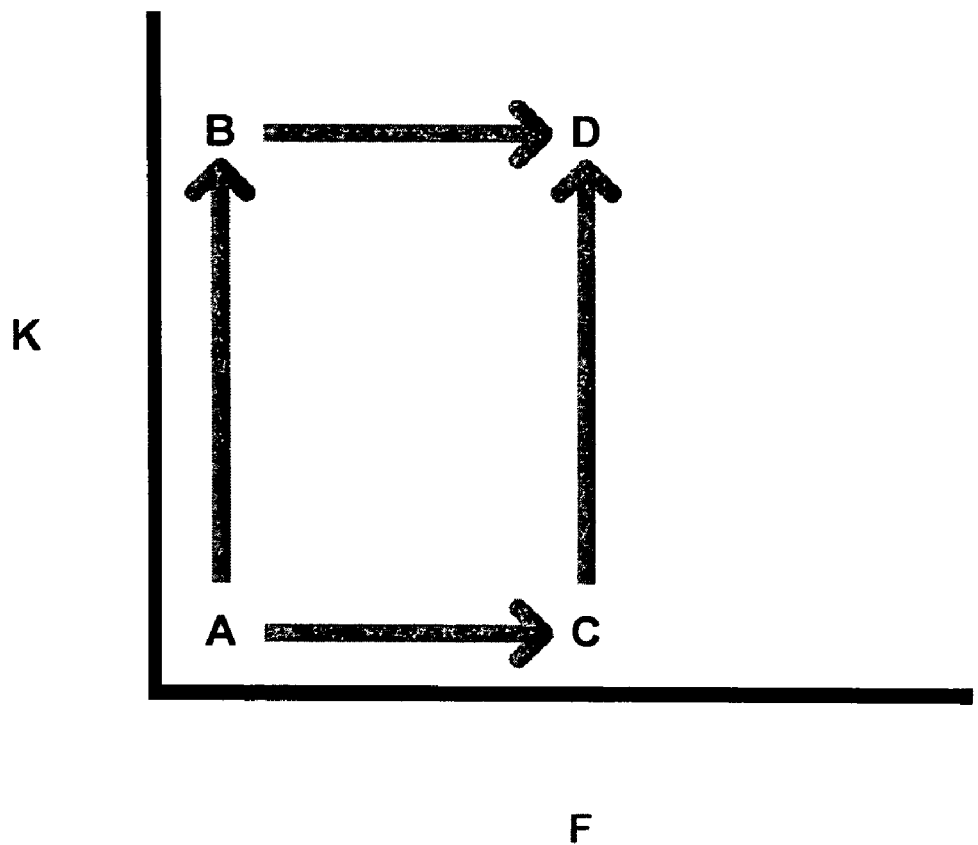
FIG. 10 is a graph representing relationships between types of listeners according to a "Frequency/Knowledge" model.

With this approach. A is High close to C. Medium close to B and Low close to D. These relationships are represented graphically in FIG. 10. The Relevance of an artist A for a given user U may therefore be provided as:

$$\text{Rel}(U,A) = (1+K(U,A))^2 + \theta(U,A)$$

where $K(A) \subset [0, 1]$ is a function that measures the Knowledge a User U has about Artist A, and $f(A) \subset [0, 1]$ is a function returning the relative frequency of User U listening to this Artist.

In some embodiments, K can be deduced from n/N where n is the number of songs from a certain artist that a user knows, and N is the total songs for this artist. F can likewise be deduced from n/P where n is the number of playcounts from a certain artist that a user has listened to, and P is the total of playcounts for this user. F may be computed through the Reach API (described above) in some implementations.

The above description fully discloses the invention including preferred embodiments thereof. Without further elaboration, it is believed that one skilled in the art can use the preceding description to utilize the invention to its fullest extent. Therefore the examples and embodiments disclosed herein are to be construed as merely illustrative and not a limitation of the scope of the present invention in any way.

It will be obvious to those having skill in the art that many changes may be made to the details of the above-described embodiments without departing from the underlying principles of the invention. Therefore, it is to be understood that the invention is not to be limited to the specific embodiments disclosed and that modifications and other embodiments are intended to be included within the scope of the appended claims.

The scope of the present invention should, therefore, be determined only by the following claims.

The invention claimed is:

1. A method for recommending users in a user community to a target user, the method comprising:
   selecting a target user within the user community;
   selecting a user set within the user community excluding the target user;
   comparing a user profile for the target user with user profiles for each of the users in the user set to assess similarity of the target user profile to each of the other users' profiles as a proxy for compatibility of the corresponding users; and
   generating a recommended set of compatible users for the target user responsive to the comparing step, wherein the recommended set of compatible users comprises at least one user within the selected user set; and further
   wherein the target user's profile comprises a target user media item set [IS] and a target user recommended media item set [RS];
   the user profiles for each of the users in the user set comprises a corresponding user media item set and a corresponding user recommended media item set; and
   each recommended media item set is generated by providing the corresponding user's media item set as input to a computer-implemented recommender system,
   wherein the computer-implemented recommender system that generates the recommended media item set is driven by a predetermined knowledge base stored in a memory that contains correlation metrics among a collection of media data items.

2. A method for recommending users according to claim 1, wherein:
   the correlation metrics stored in the knowledge base driving the computer-implemented recommender system to generate the recommended media item set of each user's profile reflect subjective judgments of a universe of other users outside of the said user community.

3. A method for recommending users according to claim 1, wherein:
   the stored correlation metrics are not based on objective characterizing attributes of the selected media items.

4. A method for recommending users according to claim 1, wherein:
   the correlation metrics stored in the knowledge base driving the computer-implemented recommender system to generate the recommended media item set of each user's profile reflect the numbers of co-occurrences of pairs of media items together within the personal playlists of a universe of other users outside of the said user community, so that the correlation metrics are a function of the outside users' subjective decisions to include a pair of selected media items together within a data set or playlist, without regard to characterizing attributes of the selected media items.

5. A method for recommending users according to claim 1, wherein:
   said comparing the user profiles includes determining an intersection of the target user media item set with the respective recommended media item sets of each of the users in the selected user set.

6. A method for recommending users according to claim 1, wherein:
   said comparing the user profiles includes determining an intersection of the target user recommended media item set with the respective recommended media item sets for each of the users in the selected user set.

7. A method for recommending users according to claim 1, wherein:
   said comparing the user profiles includes determining an intersection of the target user recommended media item set with the respective media item sets for each of the users in the selected user set.

8. A computer-readable medium having stored thereon computer executable instructions for performing a method for recommending users in a user community, the method comprising:
   selecting a first user within the user community;
   selecting a user set within the user community;
   comparing a user profile for the first user with user profiles for each of the users in the user set; and
   generating a recommended user set for the first user responsive to the comparing step, wherein the recommended user set comprises at least one user within the user community; and further
   wherein the selected first user's profile comprises a first user media item set and a first user recommended media item set;
   the user profiles for each of the users in the selected user set comprises a corresponding user media item set and a corresponding user recommended media item set;
   each recommended media item set is generated by providing the corresponding user's media item set as input to a computer-implemented recommender system;
   and the computer-implemented recommender system that generates the recommended media item set is driven by a predetermined knowledge base stored in a memory that contains correlation metrics among a collection of media data items.

9. The computer-readable medium of claim 8, wherein the comparing a user profile for the first user with user profiles for each of the users in the user set includes computing a total relevance of the target user to each of the users in the user set, wherein the total relevance is a function of at least one of an affinity metric, a discovery metric and a guidance metric; wherein
   the affinity metric determines an intersection $M_a \cap M_b$ of the target user's media set with the other users' respective media sets;
   the discovery metric determines an intersection $R_a \cap M_b$ of the other users' respective media sets with the target user's recommended media set; and
   the guidance metric determines an intersection $M_a \cap R_b$ of the target user's media set with the other users' respective recommended media sets.

10. The computer-readable medium of claim 8, wherein the correlation metrics stored in the knowledge base driving the computer-implemented recommender system to generate the recommended media item set of each user's profile reflect subjective judgments of a universe of other users outside of the said user community.

11. A method for recommending users according to claim 8, wherein:
    the stored correlation metrics are not based on objective characterizing attributes of the selected media items.

12. A method for recommending users according to claim 8, wherein:
    the correlation metrics stored in the knowledge base driving the computer-implemented recommender system to generate the recommended media item set of each user's profile reflect the numbers of co-occurrences of pairs of media items together within the personal playlists of a universe of other users outside of the said user community, so that the correlation metrics are a function of the outside users' subjective decisions to include a pair of selected media items together within a data set or playlist, without regard to characterizing attributes of the selected media items.

13. A method for recommending users according to claim 8, wherein:

said comparing the user profiles includes determining an intersection of the target user media item set with the respective recommended media item sets of each of the users in the selected user set.

14. A method for recommending users according to claim 8, wherein:

said comparing the user profiles includes determining an intersection of the target user recommended media item set with the respective recommended media item sets for each of the users in the selected user set.

15. A method for recommending users according to claim 8, wherein:

said comparing the user profiles includes determining an intersection of the target user recommended media item set with the respective media item sets for each of the users in the selected user set.

* * * * *